US012775517B2

(12) United States Patent
Potti et al.

(10) Patent No.: US 12,775,517 B2
(45) Date of Patent: Oct. 27, 2026

(54) OPTIMIZING DIAGNOSTIC APPROACHES AND SOLUTIONS FOR DATA PROCESSING SYSTEMS

(71) Applicant: Dell Products L.P., Round Rock, TX (US)

(72) Inventors: Ashok Narayanan Potti, Bangalore (IN); Zijia Wang, London (GB); Tsehsin Jason Liu, Wellesley, MA (US); Dale Wang, Hayward, CA (US); Min Gong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 18/989,978

(22) Filed: Dec. 20, 2024

(65) Prior Publication Data

US 2026/0178435 A1 Jun. 25, 2026

(51) Int. Cl.
*G06F 11/07* (2006.01)
*G06F 11/00* (2006.01)

(52) U.S. Cl.
CPC ........ *G06F 11/0793* (2013.01); *G06F 11/006* (2013.01); *G06F 11/0709* (2013.01)

(58) Field of Classification Search
CPC . G06F 11/0793; G06F 11/079; G06F 11/0709
See application file for complete search history.

(56) References Cited

U.S. PATENT DOCUMENTS

| | | | |
|---|---|---|---|
| 6,836,750 | B2 | 12/2004 | Wong |
| 9,658,914 | B2 | 5/2017 | Ganesan |
| 9,898,389 | B2 | 2/2018 | Campbell |
| 10,096,030 | B1 | 10/2018 | Hayon |
| 10,795,792 | B2 | 10/2020 | Savino |
| 11,283,863 | B1 | 3/2022 | Cleaver |
| 2005/0289071 | A1 | 12/2005 | Goin |
| 2011/0083122 | A1 | 4/2011 | Chen |
| 2011/0154331 | A1 | 6/2011 | Ciano |

(Continued)

OTHER PUBLICATIONS

Garcia-Morato et al., "A General Framework for Distributed Approximate Similarity Search With Arbitrary Distances", arXiv:2405.13795v2, Aug. 7, 2024, retrieved from <https://arxiv.org/pdf/2405.13795> on Dec. 18, 2024 (21 pages).

(Continued)

*Primary Examiner* — Ashish Thomas
*Assistant Examiner* — Catherine Marie Nguyen
(74) *Attorney, Agent, or Firm* — WOMBLE BOND DICKINSON (US) LLP

(57) ABSTRACT

Methods and systems for managing operation of a deployment comprising data processing systems are disclosed. The operation may be managed by optimizing a diagnostic approach and/or a solution for an issue of an operation by a data processing system. The diagnostic approach may be optimized by using a trained inference model and/or at least one similarity map to identify at least one other data processing system. The at least one other data processing system may include contextual data for the issue. The data processing system may provide the issue and/or the contextual data to a large language model and/or a tree of thought model. The data processing system may use the tree of thought model to generate a remediative procedure for the issue.

20 Claims, 14 Drawing Sheets

(56) References Cited

U.S. PATENT DOCUMENTS

| | | | | |
|---|---|---|---|---|
| 2017/0024240 | A1 | 1/2017 | Black | |
| 2017/0235624 | A1 | 8/2017 | Farinacci | |
| 2021/0350248 | A1 * | 11/2021 | Rogers | G06N 5/027 |
| 2022/0303291 | A1 * | 9/2022 | Baldini Das Neves | G06N 5/022 |
| 2023/0022222 | A1 * | 1/2023 | Files | G06N 3/08 |
| 2023/0195560 | A1 * | 6/2023 | Haririan | G06F 11/0772 714/26 |
| 2024/0267280 | A1 * | 8/2024 | Madiya | H04L 41/064 |
| 2025/0061307 | A1 * | 2/2025 | Tran | G06N 3/045 |
| 2025/0307712 | A1 * | 10/2025 | Carofiglio | G06N 20/00 |
| 2025/0370837 | A1 * | 12/2025 | Koga | G05B 19/404 |
| 2026/0025407 | A1 * | 1/2026 | Himmelhuber | G06N 5/022 |

OTHER PUBLICATIONS

Tennenholtz et al., "Demystifying Embedding Spaces Using Large Language Models", arXiv:2310.04475v2, Mar. 13, 2024, retrieved from <https://arxiv.org/html/2310.04475v2> on Dec. 18, 2024 (34 pages).

Um et al., "Vector Embeddings by Sequence Similarity and Context for Improved Compression, Similarity Search, Clustering, Organization, and Manipulation of cDNA Libraries", arXiv:2308.05118, Aug. 8, 2023, retrieved from <https://arxiv.org/abs/2308.05118> on Dec. 18, 2024 (15 pages).

Dale Markowitz, "Meet AI's multitool: Vector embeddings", Google Cloud, Mar. 23, 2022, retrieved from <https://cloud. google.com/blog/topics/developers-practitioners/meet-ais-multitool-vector-embeddings> on Dec. 18, 2024 (5 pages).

* cited by examiner

OPTIMIZING DIAGNOSTIC APPROACHES AND SOLUTIONS FOR DATA PROCESSING SYSTEMS

FIELD

Embodiments disclosed herein relate generally to managing operation of a deployment comprising data processing systems. More particularly, embodiments disclosed herein relate to optimizing diagnostic approaches and solutions for the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
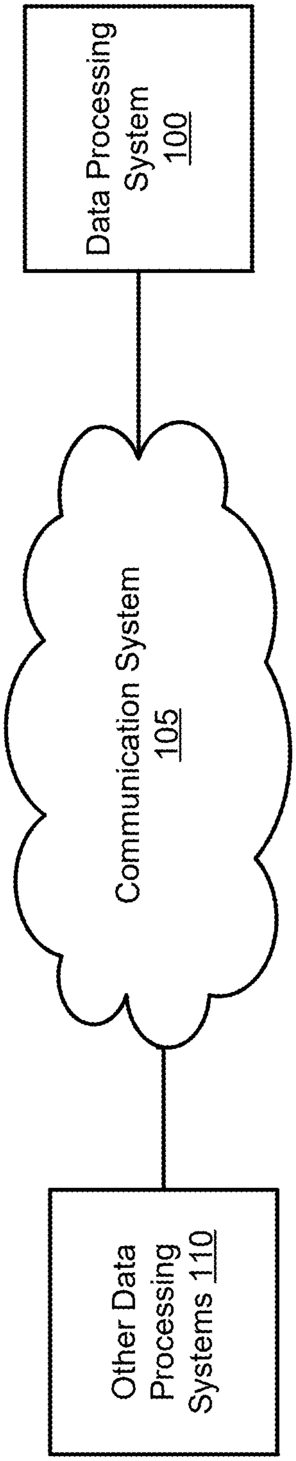
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to managing operation of a deployment comprising data processing systems. The operation may be managed by optimizing at least one diagnostic approach for generating a solution for an issue of an operation by a data processing system.

To optimize the at least one diagnostic approach, a similarity map of the data processing system may be ingested by a trained inference model (e.g., a graph neural network, a machine learning model, a relational graph convolution network, etc.). From the similarity map, a target node (representing the data processing system) may be selected. Using the trained inference model (e.g., a graph neural network, a machine learning model, a relational graph convolution network, etc.), an exchange of information may take place between the target node and/or the at least one neighboring node (representing at least one other data processing system) to generate a context embedding. The context embedding may include contextual data related to the issue from the at least one other data processing system.

The data processing system may retrieve the contextual data from the context embedding and provide the contextual data and/or the issue to a large language model (LLM). The LLM may ingest the contextual data and/or the issue to generate at least one diagnosis option and/or at least one solution option. The at least one diagnosis option and/or at least one solution option may be ingested by a tree of thought model. The data processing system may use the tree of thought model to generate a remediation procedure for the issue.

If the remediation procedure is determined to not be effective to rectify the issue, the trained inference model (e.g., a graph neural network, a machine learning model, a relational graph convolution network, etc.) may be used to generate additional context embedding. The additional context embedding may include additional contextual data related to the issue from a second at least one other data processing system. The data processing system may provide the additional context data to the LLM and/or the tree of thought model to generate a second remediation procedure.

In an embodiment, a method for managing operation of a deployment comprising data processing systems is disclosed. The method may include: (i) making an identification that an issue is impacting operation of a data processing system of the data processing systems, (ii) assessing, based on the identification and by the data processing system, whether the issue can be resolved using local data, (iii) in a first instance of the assessing where the issue cannot be resolved using the local data: (a) identifying, by the data processing system and using at least a similarity map of the data processing systems, a portion of the data processing systems, (b) attempting, by the data processing system in collaboration with the portion of the data processing systems, to identify a remediation procedure for the issue, (c) in a first instance of the attempting where the remediation procedure is identified: performing, by the data processing system, the remediation procedure to facilitate continued provisioning of computer implemented services by the data processing system.

The method may further include, in a second instance of the attempting where the remediation procedure is not identified: (i) initiating, by the data processing system, selection of a second portion of the data processing systems by the portion of the data processing systems using similarity maps for the portion of the data processing systems, and (ii) attempting, by the data processing system in collaboration with the second portion of the data processing systems, to identify the remediation procedure for the issue.

Attempting to identify the remediation procedure for the issue may include (i) generating a tree of thought to guide prompting of large language models hosted by the portion of the data processing systems to attempt to identify the remediation procedure for the issue, (ii) at least partially distribute portions of the tree of thought for evaluation by the portion of the data processing systems to obtain a plurality of partial processing results, (iii) aggregating the partial processing results to obtain a global processing result, and (iv) using the global processing result as the remediation procedure.

The similarity map of the data processing systems may be based, at least in part, on a graph neural network trained on a knowledge graph of the data processing systems.

The knowledge graph may include nodes corresponding to the data processing systems and edges that are based on relationships between the data processing systems.

Each node may be associated with a plurality of attributes reflecting characteristics of the respective node.

Each data processing system may host an instance of a trained large language model and a prompt enhancement system.

The prompt enhancement system may supplement prompts submitted to the trained large language model based on local data and data from at least one of the portion of the data processing systems.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, a data processing system may perform an operation. The operation may include (i) collecting data, (ii) processing data, (iii) storing data, (iv) transmitting data, etc. During performance of the operation, an issue may occur that impacts the performance of the operation. The issue may include (i) a sensor failure, (ii) a breakdown in network connectivity, (iii) a security breach, (iv) data corruption, etc.

To resolve the issue, the data processing system may use contextual data. The contextual data may include (i) at least one performance metric, (ii) user activity data, (iii) configuration data, etc. However, the data processing system may not have the contextual data. Without the contextual data, the data processing system may generate the resolution that does not resolve the issue and/or may not generate a resolution for the issue. Consequently, provision of the computer implemented services by the data processing system may be impacted.

In general, embodiments disclosed here relate to systems and methods for managing operation of a deployment comprising data processing systems. The operation may be managed by collaborating, by at least two processing systems, to identify an issue that impacts operation of a data processing system.

The operation may include (i) collecting data, (ii) processing data, (iii) storing data, (iv) transmitting data, etc. The issue may include (i) a sensor failure, (ii) a breakdown in network connectivity, (iii) a security breach, (iv) data corruption, etc.

A collaboration may be made by the at least two processing systems because the data processing system may be unable to solely resolve the issue. The data processing system may be unable to solely resolve the issue because the data processing system may not include contextual data related to the issue and/or at least one application, service, task, etc. related to the operation impacted by the issue.

If the data processing system includes the contextual data, the data processing system may provide the contextual data to a large language model (LLM) (e.g., GPT-4, Claude 3, Gemini, LLaMa, Command, etc.). The contextual data may be ingested by the LLM to populate, by the data processing system, a tree of thought model that is used to identify a solution to the issue.

The tree of thought model may include a tree-like structure of first nodes and/or branches. The purpose of the tree may include evaluating at least one outcome to identify the solution to the issue. The first nodes may include a potential state and/or a decision and the branches may represent outcomes and/or actions. A root of the tree may represent an initial state of an issue and/or each level of the first nodes may include the potential state and/or the decision that results from an action of a previous level.

To accurately evaluate the at least one outcome, the data processing system may provide the issue to the LLM. However, because the LLM may ingest at least the issue and/or not ingest the contextual data, the LLM may not accurately evaluate the problem. If the issue along with the contextual data is ingested by the LLM, the LLM may include (i) at least one response that is relevant to the issue, (ii) the solution that likely resolves the issue effectively, (iii) at least one precise detail concerning performance of the solution, etc.

To make the collaboration between the at least two processing systems, at least one other data processing system may be identified. The at least one other data processing system may be identified ingesting, by a trained inference model, a target node of the data processing system of a similarity map to generate a context embedding of the data processing system with the at least one other data processing system. The at least one other data processing system may include the contextual data.

The similarity map may include a knowledge graph. A knowledge graph may include second nodes and/or second edges. A target node of the second nodes may represent the data processing system. The target node may include the attributes of the profile of the data processing system. The profile (i.e., self-profile) may include (i) device information (ii) network information, (iii) configuration information, (iv) workload information, etc. The profile may be transformed into at least one feature vector and/or stored in the target node. A string, integer, float, category, etc. of the profile may be transformed into the at least one feature vector using (i) one-hot encoding, (ii) label encoding, (iii) word embeddings, (iv) term frequency, (v) inverse document frequency, etc.

The context embedding may include a representation of a target node that describes context of neighboring nodes (e.g., the at least one other data processing system) of the target node. The neighboring nodes may include the at least one other data processing system that has at least one attribute that is similar to a second at least one attribute of the data processing system. The context may include (i) at least one communication pattern, (ii) at least one dependency relationship, (iii) at least one operating environment, (iv) at least one configuration setting, etc.

To generate the context embedding by the trained inference model (e.g., a graph neural network, a machine learning model, a relational graph convolution network, etc.), an exchange of information may take place between the target node an at least one neighboring node (e.g., at least one first nearest neighboring node, at least one second nearest neighboring node, etc.). The exchange of the information may create at least one link between the target node and the at least one neighboring node. The information may include (i) contextual data, (ii) at least one configuration, (iii) at least one process, etc. that links the data processing system and the at least one other data processing system. The information may be used to identify the at least one other data processing system (e.g., the at least one neighboring node).

Generation of the context embedding of the target node may be desirable in a search for the at least one other data processing system. Generation of the context embedding may be desirable because the generation may use less computational resources than a similarity search that includes a sub-graph search using the similarity map. Further, the trained inference model may include at least one generalization of the similarity map upon ingesting a target node. The at least one generalization may account for at least one update to the similarity map.

Once the at least one other data processing system has been identified using the context embedding, a remediation procedure may be identified in the collaboration between the data processing system and/or the at least one other data processing system. The remediation procedure may be identified by (i) ingesting, by the LLM, the issue along with the contextual data (which has been provided by the at least one other data processing system) to generate a first output (e.g., at least one diagnosis option and/or at least one solution option, etc.) (ii) populating the tree of thought model with the first output, (iii) selecting at least one action from each level of the first nodes from the tree of thought model, (iv) evaluating the at least one action and/or at least one outcome that follows, and (v) selecting, from the at least one action and/or the at least one outcome, the remediation procedure.

If the remediation procedure has not been identified by the data processing system and/or the data processing system, additional context embedding may be generated to enable an inclusion of more data processing systems of the at least one other data processing system. The inclusion of the more data processing systems may include less similar and/or more diverse data processing systems. The less similar and/or the more diverse data processing systems may enhance the identification of the remediation procedure by (i) sharing diverse contextual data, (ii) using different hardware resources to ensure a task of the remediation procedure is more computationally feasible, (iii) using different security protocols that can affect how a diagnosis is performed, etc. The additional context embedding may be generated by exchanging the information between the target node and at least one additional neighboring node (e.g., beyond at least one first nearest neighboring node, beyond at least one second nearest neighboring node, etc.).

Finally, once the remediation procedure has been identified, the remediation procedure may be performed. The data processing system may perform the remediation procedure. The data processing system may perform the resolution procedure by performing at least one task of the remediation procedure. The at least one task may include (i) reallocating central processing unit (CPU) and/or memory resources of a data processing system, (ii) identifying and/or terminating a process that consumes excessive CPU resources, (iii) using a load balancer to evenly distribute at least one request to the data processing system, (iv) restarting at least one service, (v) deleting at least one log and/or clearing a disk cache to free up storage space, etc. By performing the at least one task of the remediation procedure, the provision of the computer implemented services may be continued.

To provide the above noted functionality, the system may include data processing system 100 and other data processing system 110. Data processing system 100 and/or other data processing system 110 may include computing devices that provide the computer implemented services. For example, data processing system 100 and/or other data processing system 110 may independently and/or cooperatively provide the computer-implemented services. The computer implemented services may be provided to users and/or other computing devices operably connected to data processing system 100 and/or other data processing system 110.

The computer-implemented services may include any type and quantity of services including, for example, database services, instant messaging services, video conferencing services, prediction and/or inference generation services, machine learning/artificial intelligence (AI) related services, data science related services, etc. Different systems may provide similar and/or different computer-implemented services. To provide the computer-implemented services, data processing system 100 and/or other data processing system 110 may host applications and/or computer-implemented models (e.g., large language models (LLM), generative artificial intelligence (AI) models, prompt enhancement systems (PES) etc.) that provide these computer-implemented services. The PES may provide contextual data to an LLM during utilization of the LLM by data processing system 100 and/or other data processing system 110. For example, the applications may utilize (e.g., invoke use of, etc.) one or more backend components (e.g., the computer-implemented models, policies, backend applications, data and infrastructures, etc.) to provide the computer-implemented services.

While providing their functionality, any of data processing system 100 and other data processing system 110 may perform all, or a portion, of the flows and methods shown in FIGS. 2A-3B.

Any of (and/or components thereof) data processing system 100 and other data processing system 110 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 105. In an embodiment, communication system 105 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2C, 2F, and 2H. In these diagrams, flows of data and processing of data are illustrated using different sets of shapes. A first set of shapes (e.g., 200, 203, etc.) is used to represent data structures, a second set of shapes (e.g., 202, 204, etc.) is used to represent processes performed using and/or that generate data, and a third set of shapes (e.g., 250, 260, etc.) is used to represent large scale data structures such as databases, etc.

Figure 2A:
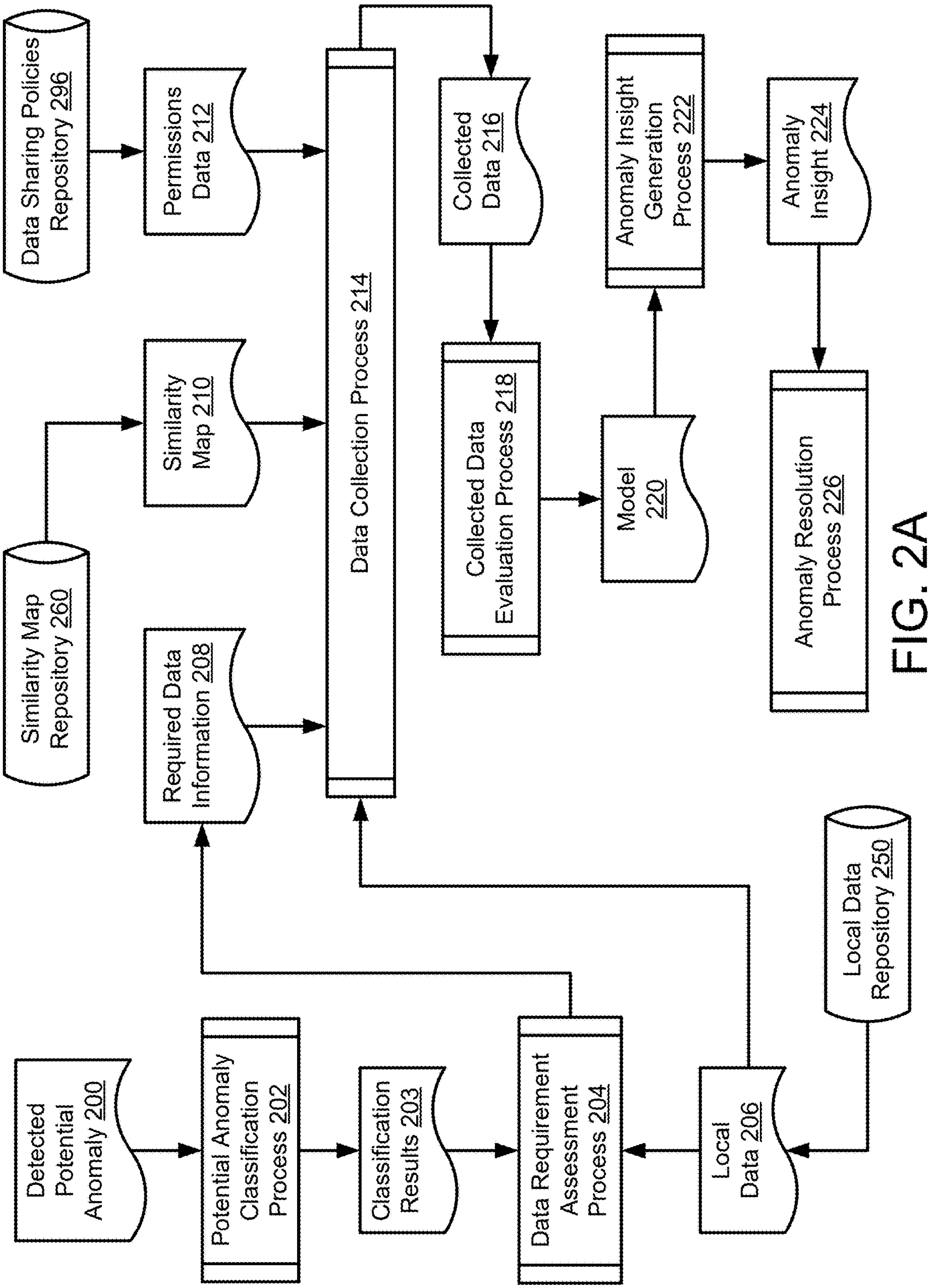
FIGS. 2A-2C, 2F, and 2H show data flow diagrams illustrating operation of a system in accordance with an embodiment.

Turning to FIG. 2A, a first data flow diagram in accordance with an embodiment is shown. The first data flow diagram may illustrate data used in and data processing performed in resolving an anomaly that has been detected by a data processing system (e.g., 100).

As shown in FIG. 2A, a data processing system (e.g., 100) may obtain detected potential anomaly 200. The detected potential anomaly may include any type of data (e.g., telemetry data, system metrics, operational data/metrics, system log data, application data, etc.) that can be gathered by the data processing system (e.g., 100) from itself (e.g., its own components and operations). For example, the detected potential anomaly 200 may include data indicative of an unusual spike in central processing unit (CPU) usage. The detected potential anomaly 200 may also include data indicative of other changes in other system metrics such as memory consumption, etc.

In embodiments, to be able to obtain the detected potential anomaly 200, the data processing system (e.g., 100) may be configured to locally manage its own data. In particular, the data processing system (e.g., 100) may be configured to autonomously manage its own operational data by gathering data such as (i) telemetry data including performance metrics (e.g., CPU usage, memory consumption, network throughput, error logs, etc.), (ii) application data such as data generated by applications (e.g., user activity logs, transaction records, sensor data, etc.) running on the data processing system (e.g., 100), etc. Other types of data about itself may be gathered by the data processing system (e.g., 100) without departing from the scope of embodiments disclosed herein.

Once gathered, the data processing system (e.g., 100) may classify and profile each of the gathered data by (i) organizing data into categories based on type, source, usage, etc. to facility faster access, (ii) implement data retention policies, etc. for determining how long different types of data are stored, ensuring that storage resources are used efficiently, (iii) ensuring that all stored data (or all sensitive data) is encrypted to protect sensitive information from unauthorized access, etc. Other types of data classification and profiling (e.g., data processing) mechanisms may be used without departing from the scope of embodiments disclosed herein.

Once gathered and processed (e.g., classified and profiled), the data processing system (e.g., 100) may store the data in local data repository 250 as local data 206. In embodiments, the detected potential anomaly 200 may be obtained during such data gathering and processing processes (e.g., while the processes are being performed before the data is stored in local data repository 250) by the data processing system (e.g., 100). Alternatively, or in addition, the detected potential anomaly 200 may be obtained from local data repository 250 at any time (e.g., during routine checks of the data within local data repository 250, etc.).

For example, in embodiments, the data processing system (e.g., 100) may be configured to detect irregularities within the gathered data and/or within the local data 206 stored in local data repository 250. For example, the data processing system (e.g., 100) may be configured to use statistical methods and/or machine learning models to detect unusual patterns in the data. Once detected, the observed and/or detected irregularities may be obtained as the detected potential anomaly 200.

Turning back to FIG. 2A, the detected potential anomaly 200 may be ingested (e.g., by the data processing system (e.g., 100)) into potential anomaly classification process 202. In particular, as part of potential anomaly classification process 202, the data processing system (e.g., 100) may analyze the detected potential anomaly (e.g., using pre-stored algorithms, statistical models, machine learning models, sets of rules or policies, etc.) to assign an anomaly classification to the detected potential anomaly 200.

In embodiments, the anomaly classification may include (i) a simple solution classification indicating that the detected potential anomaly 200 could potentially be analyzed without using machine learning (e.g., using a threshold-based alert analysis, etc.), and/or (ii) a complex solution classification indicating that the detected potential anomaly 200 must be analyzed using machine learning. Although only two types of classifications are described here, other types and numbers of classifications may be used without departing from the scope of embodiments disclosed herein.

The anomaly classification generated from the potential anomaly classification process 202 may be included in classification results 203. Classification results 203 may be ingested by the data processing system (e.g., 100) into data requirement assessment process 204.

In embodiments, as part of data requirement assessment process 204, the data processing system (e.g., 100) may determine (e.g., assess, decide, etc.), using the anomaly classification, what processes (e.g., running local diagnostics without or without training (or even using) a machine learning model, etc.) and data will be required to accurately analyze the detected potential anomaly 200.

To determine the necessary processes and data, data requirement assessment process 204 may also access the local data 206 stored in local data repository 250. In particular, data requirement assessment process 204 may be configured to determine, using the anomaly classification and the local data 206, whether the data processing system (e.g., 100) itself has enough data (e.g., in the form of local data 206) or whether the data processing system (e.g., 100) will need additional data (e.g., from other sources) to accurately analyze the detected potential anomaly 200. Any type of techniques and/or mechanisms (e.g., involving use of one or more using pre-stored algorithms, statistical models, machine learning models, sets of rules or policies, etc.) may be used by data processing system (e.g., 100) to reach this determination without departing from the scope of embodiments disclosed herein.

The results of the data requirement assessment process 204 (e.g., whether the data processing system (e.g., 100) itself has enough data (e.g., in the form of local data 206) or whether the data processing system (e.g., 100) will need additional data (e.g., from other sources) to accurately analyze the detected potential anomaly 200) may be included (e.g., stored) in required data information 208.

In embodiments, required data information 208 may be ingested into data collection process 214 where the data processing system (e.g., 100) is configured to collect the required data indicated in the required data information 208. Additionally, similarity map 210 and permissions data 212 may be ingested, along required data information 208, into data collection process 214.

In embodiments, the data processing system (e.g., 100) includes a similarity map repository 260 (that is implemented as a different or the same component as local data repository 250) that stores the similarity map 210.

Similarity map 210 may be compiled, updated, and distributed to each data processing system (e.g., 100) by a second data processing system (e.g., 110, etc.). Alternatively, or in addition to the above, each data processing system (e.g., 100, 110, etc.) may also update each own locally stored similarity map 210.

In embodiments, similarity map 210 includes data that provides each data processing system (e.g., 100, 110, etc.) with a multi-dimensional view of the computer infrastructure (e.g., the system of FIG. 1) in which the data processing system (e.g., 100) belongs. In particular, the similarity map 210 may include a spatial attribute (e.g., the physical or virtual location) of each data processing system (e.g., 100, 110, etc.) within the computer infrastructure and infrastructural attributes (e.g., processing power, memory, data types handled, computer-implemented services provided, etc.) of each data processing system (e.g., 100, 110, etc.).

More specifically, the similarity map 210 may be a network topology map created in unison by all of the data processing systems (e.g., 100, 110, etc.) making up the computer infrastructure (e.g., the system of FIG. 1). For example, data processing systems (e.g., 100, 110, etc.) on the same LAN may ping and query one another (as well as network switches and routers) to produce such a network topology map. In particular, each data processing system (e.g., 100, 110, etc.) may share (e.g., with its neighboring data processing systems, etc.) its system configuration data (e.g., configuration data on its components such as the CPU, memory, hard drive (HD) and/or solid state drive (SSD) storage, operating system (OS), etc.). Each data processing system (e.g., 100, 110, etc.) may also share a list of telemetry data (e.g., system temperature, CPU utilization, memory utilization, disk input/output (IO), etc. that the data processing system is capable of collecting). Each data processing system (e.g., 100, 110, etc.) may further share its workload characteristics (e.g., average (AVG) temperature operating temperature range, AVG CPU utilization, max/min CPU utilization, memory utilization, disk utilization, etc.). Other data (e.g., data stored as local data 206 in each data processing system (e.g., 100, 110, etc.)) may also be shared to create the similarity map 210 without departing from the scope of embodiments disclosed herein.

Using similarity map 210, each data processing system (e.g., 100, 110, etc.) may advantageously gain self-awareness about its positioning within the infrastructure (e.g., the system of FIG. 1) and gain awareness of other data processing systems (e.g., 100, 110, etc.) within the infrastructure. In particular, from the spatial and infrastructural attributes included in the similarity map 210, each data processing system (e.g., 100, 110, etc.) may advantageously (i) identify relevant neighboring data processing systems (e.g., by understanding its own position within the similarity map, the data processing system (e.g., 100) can determine which the other data processing systems (e.g., 110, etc.) are most relevant for collaboration based on proximity and resource availability), (ii) optimize communication (e.g., data processing systems (e.g., 100, 110, etc.) can prioritize communication with closer or more resource-efficient neighbors, reducing latency and improving response times), (iii) enhance fault tolerance (e.g., by knowing its position and neighbors, a data processing system can reroute tasks and data if a neighboring data processing system fails, ensuring continuous operation), etc.

Detailed examples of how the similarity map 210 is used during data collection process 214 will be described below in reference to the implementation examples of embodiments disclosed herein.

In embodiments, the data processing system (e.g., 100) includes a data sharing policies repository 296 (that is implemented as a different or the same component as local data repository 250 and/or the similarity map repository 260) that stores the permission data 212.

Additionally, the data processing system (e.g., 100) may be configured to include a data sharing agent (e.g., implemented in hardware, software, or a combination thereof such as an application processing interface (API), etc.) that compiles and manages the permissions data 212. The data sharing agent may also be configured to help each data processing system (e.g., 100, 110, etc.) share data securely and/or efficiently with other data processing systems (e.g., 100, 110, etc.) within the infrastructure.

In embodiments, the data sharing agent may be configured to have functions and capabilities such as (i) authentication and authorization capabilities that ensure only authorized data processing systems (e.g., 100, 110, etc.) are able to access data stored on other data processing systems (e.g., each data processing system (e.g., 100, 110, etc.) must authenticate itself to all other data processing systems (e.g., 100, 110, etc.) from which it wishes to retrieve data (e.g., local data 206 of each data processing system (e.g., 100, 110, etc.), etc.) using secure tokens, certificates, etc.), (ii) query interface capabilities that allow data processing systems (e.g., 100, 110, etc.) to request specific datasets from other data processing systems (e.g., queries may be tailored based on data type, time, range, etc.), (iii) data transfer protocol capabilities that utilize efficient and secure data transfer protocols (e.g., Hypertext Transfer Protocol Secure (HTTPS), gRPC Remote Procedure Calls (gRPC), etc.) to ensure data integrity and minimize transfer times, (iv) data format standardization capabilities that endure that shared data is sin a standardized format (e.g., JavaScript Object Notation, Extensible Markup Language, etc.) for easy parsing and integration by the receiving data processing system (e.g., 100, 110, etc.), (v) rate limiting and quotas capabilities where rate limiting and data quotas may be implemented to prevent abuse and ensure fair resource usage across the network, (vi) logging and auditing capabilities that keep detailed logs of data sharing activities for auditing and troubleshooting purposes, etc. The data sharing agent may have other functions and capabilities not discussed above without departing from the scope of embodiments disclosed herein.

In embodiments, the permissions data 212 may include the required permissions for accessing stored data from each data processing system (e.g., 100, 110, etc.) within the infrastructure. Given appropriate data access permissions (e.g., using the data stored in permissions data 212), data processing systems (e.g., 100, 110, etc.) can filter and select (e.g., through interaction of a data processing system's data sharing agent with another data processing system's data sharing agent) usable data from the other data processing systems (e.g., 110, etc.).

For example, using permissions data 212, the data sharing agent of the data processing system (e.g., 100) may: (i) issue specific queries to retrieve data relevant to the problem a data processing system is experiencing (e.g., the data listed in required data information 208), ensuring that only necessary data is transferred between data processing systems (e.g., 100, 110, etc.), (ii) ensuring that data sharing adheres to each data processing system's security and privacy policies, with permissions controlling which data processing systems (e.g., 100, 110, etc.) can access which data, (iii) applying filters to select only the most relevant data (e.g., associated with the data listed in required data information 208), optimizing bandwidth usage and reducing unnecessary data processing, etc.), etc.

Such mechanisms (e.g., selective access mechanisms) implemented by the data sharing agent using permissions data 212 advantageously allows the data processing system (e.g., 100) to gather precise data needed for analyzing detected potential anomaly 200 while minimizing overhead and maintaining security.

In embodiments, using required data information 208 in connection with similarity map 210, permissions data 212, and/or local data 206 from local data repository 250, data collection process 214 may generate collected data 216 (also referred to herein as "a set of data required for analyzing the potential anomaly"). Collected data 216 may include all data determined (e.g., using required data information 208 in connection with similarity map 210, permissions data 212, and/or local data 206 from local data repository 250) by the data processing system (e.g., 100) to be required for accurately analyzing (e.g., locally analyzing) the detected potential anomaly 200.

In embodiments, the data processing system (e.g., 100) may ingest collected data 216 into collection data evaluation process 218 to generate one or more models 220. Depending on the anomaly classification determined in potential anomaly classification process 202, the model(s) 220 may be one or more machine learning-based models, one or more non machine learning-based models, or a combination of both.

For example, if the detected potential anomaly 200 was classified as a simple solution classification, the model(s) 220 may be one or more non-machine learning-based models (e.g., statistical models, threshold-based models, etc.). Additional examples and details will be described below in reference to the implementation examples of embodiments disclosed herein.

In embodiments, data processing system (e.g., 100) may ingest the model(s) 220 and the detected potential anomaly 200 into anomaly insight generation process 222 to obtain (e.g., generate) an anomaly insight 224. In particular, the detected potential anomaly 200 may be used as input data and compared to the information included in the model(s) 220 to obtain the anomaly insight 224. Anomaly insight may indicate whether the detected potential anomaly 200 is an actual (e.g., real) anomaly (or a false alarm). An actual anomaly may be an irregularity that could cause the data processing system (e.g., 100) to fail in its entirety (or a specific component within the data processing system (e.g., 100) to fail and require replacement). Additional examples and details will be described below in reference to the implementation examples of embodiments disclosed herein.

In embodiments, collected data evaluation process 218 and anomaly insight generation process 222 may be part of a local processing mechanism performed by the data processing system (e.g., 100). In particular, using the local processing mechanism, each data processing system (e.g., 100, 110, etc.) may leverage their computational capabilities to perform necessary data processing and model training locally including, for example: (i) statistical analysis for performing basic statistical analyses to gain insights from data quickly, (ii) machine learning including training and deploying machine learning models using the collected data 216 to predict trends, detect anomalies, or optimize performance, (iii) real-time processing for handling time-sensitive tasks directly on the data processing system (e.g., 100) to ensure timely responses without waiting for central processing, etc.

By enabling each data processing system (e.g., 100, 110, etc.) within the infrastructure to include such local processing mechanisms to process collected data based on each data processing system's self-awareness within the infrastructure, each data processing system (e.g., 100, 110, etc.) may advantageously provide faster insights and actions and reduce dependency on a central processing entity (thus removing each data processing system (e.g., 100, 110, etc.) from the limitations associated with relying on such a central processing entity).

In embodiments, data processing system (e.g., 100) may ingest anomaly insight 224 into an anomaly resolution process 226 to obtain (e.g., generate, determine, etc.) one or more anomaly resolution actions (e.g., to resolve the actual anomaly and obtain an anomaly resolved data processing system (e.g., 100)). Such anomaly resolution actions may include, for example, (i) notifying a user (e.g., admin) of the data processing system (e.g., 100), (ii) automatically perform one or more update/troubleshooting mechanisms to resolve the anomaly, (iii) do nothing is the detected potential anomaly 200 is not actually an anomaly, (iv) initiate automatic requests for part and/or component replacements (e.g., automatically transmit a request for a replacement CPU or SDD to be physically delivered to the location where the data processing system (e.g., 100) is at so that the replacement CPU or SDD can be installed into the data processing system (e.g., 100), etc.), etc.

Implementation examples of the processes discussed in the data flow diagram of FIG. 2A will now be discussed. A first implementation example will be described with respect to a simple case that does not require machine learning techniques for the anomaly analysis and resolution by the data processing system (e.g., 100).

In particular, in the first implementation example, a data processing system (e.g., 100) detects a usual spike in its CPU usage. This spike is significant enough to warrant further investigation, but it is isolated, with no other apparent anomalies in other metrics.

Upon determining this spike (e.g., as detected potential anomaly 200), the data processing system (e.g., 100), may determine (e.g., as part of potential anomaly classification process 202 and data requirement assessment process 204) that it only needs CPU usage data from similar data processing systems (e.g., 110, etc.) to calculate a threshold (for comparing the spike to) in order to determine whether spike in the CPU usage is an actual anomaly.

Based on this determination (e.g., as part of data collection process 214), the data processing system (e.g., 100) can identify and query neighboring data processing systems (e.g., similar neighboring data processing systems) for their recent CPU usage data (while also ensuring that the data processing system (e.g., 100) has the necessary permissions to access such data). Said another way, the data processing system (e.g., 100) may retrieve CPU metrics from neighboring data processing systems with similar functions and configurations (e.g., using the self-awareness it has gained from the similarity map 210) as the data processing system (e.g., 100).

With the collected CPU data, the data processing system (e.g., 100) may generate (e.g., as part of collected data evaluation process 218) a non-machine learning-based model (e.g., by calculating a threshold for what should be normal CPU usage).

The data processing system (e.g., 100) may then (e.g., as part of anomaly insight generation process 222 and anomaly resolution process 226) compare the initially detected spike in CPU usage to the calculated threshold (e.g., included in the non-machine learning-based model) to determine whether the spike is an actual anomaly. For example, if the detected spike in CPU usage exceeds the calculated threshold, an alert may be triggered by the data processing system (e.g., 100) and the data processing system (e.g., 100) may perform other processes (e.g., reallocating resources and/or restarting services) to resolve the anomaly.

A second implementation example will now be described with respect to a complex case that does require use of one or more machine learning techniques for the anomaly analysis and resolution by the data processing system (e.g., 100).

In the second implementation example, the data processing system (e.g., 100) detects an unusual spike in CPU usage. Along with the usual spike in CPU usage, the data processing system (e.g., 100) also detects changes in other system metrics, such as memory consumption and IOPS (Input/Output Operations Per Second). These combined changes (e.g., detected potential anomaly 200) suggest a more complex situation that may require comprehensive analysis to determine if the CPU spike is genuinely anomalous.

Based on such detected data, the data processing system (e.g., 100) determines (e.g., as part of potential anomaly classification process 202 and data requirement assessment process 204), that it needs a broader dataset, including additional metrics such as memory consumption and input/output operations per second (IOPS), to accurately identify the anomaly. It also seeks labeled data (if available as part of local data 206) that contains known alerts or issues to help train a more accurate model. If labeled data is not available, it collects the necessary data as unlabeled data.

In particular, the data processing system (e.g., 100) identifies and queries (e.g., as part of data collection process 214) neighboring data processing systems (e.g., 110, etc.) for a more extensive dataset, including CPU usage, memory consumption, and IOPS. It also requests any available labeled data indicating known anomalies or alerts. If labeled data is not available, it collects the necessary metrics as unlabeled data.

Once the data has been collected (e.g., as collected data 216), the data processing system (e.g., 100) may use a supervised approach or an unsupervised approach for generating one or more machine learning models (e.g., as model 220 using collected data evaluation process 218). For example, using the supervised approach (e.g., if labeled data is available), the data processing system (e.g., 100) uses the labeled data to train a supervised classification model (e.g., a decision tree or a neural network, etc.). This model learns to distinguish between normal and anomalous behavior based on the combined metrics.

Using the unsupervised approach (e.g., if only unlabeled data is available), the data processing system (e.g., 100) applies unsupervised clustering techniques (e.g., k-means clustering, Density-Based Spatial Clustering of Applications with Noise (DBSCAN), etc.) to identify patterns and outliers in the data. This approach helps the data processing system (e.g., 100) detect anomalies based on the clustering results.

In the supervised approach (and as part of anomaly insight generation process 222 and anomaly resolution process 226), the data processing system (e.g., 100) uses the trained classification model to evaluate the current metrics. If the model predicts an anomaly, the data processing system (e.g., 100) triggers alerts or takes automated actions (e.g., performs the one or more anomaly resolution actions). In the unsupervised approach, the data processing system (e.g., 100) analyzes the clustering results to identify whether its current metrics fall into an anomalous cluster. If so, data processing system (e.g., 100) triggers alerts or takes automated actions to address the detected issue.

In embodiments, at any time during the processes discussed in the data flow diagram of FIG. 2A, the data processing system (e.g., 100) may determine that it does not have the computational resources (e.g., enough limited computing resources) to complete the analysis of the detected potential anomaly. Such determination may be based, for example, on one or more predetermined set of rules set by the user or any other similar and/or suitable means. For example, if at potential anomaly classification process 202 the data processing system (e.g., 100) determines that machine learning models are required but (e.g., based on one or more pre-defined rules or policies, its own analysis of its system capabilities, etc.) it does not have sufficient limited computing resources to be able to train and use such machine learning models, data processing system (e.g., 100) may then provide all of the currently obtained results and data (e.g., classification results 203 and detected potential anomaly 200) along with is local data 206 to, for example, a second data processing system (e.g., 110) to perform the anomaly analysis and resolution.

Thus, via the first data flow illustrated in FIG. 2A, a system in accordance with an embodiment may resolve the anomaly that has been detected by a data processing system (e.g., 100). Consequently, the data processing system (e.g., 100) may be more likely to be able to provide desired computer implemented services by collaborating with at least one other data processing system (e.g., 110) to perform an analysis of and/or mitigate, remove, etc. at least one effect of the anomaly.

Figure 2B:
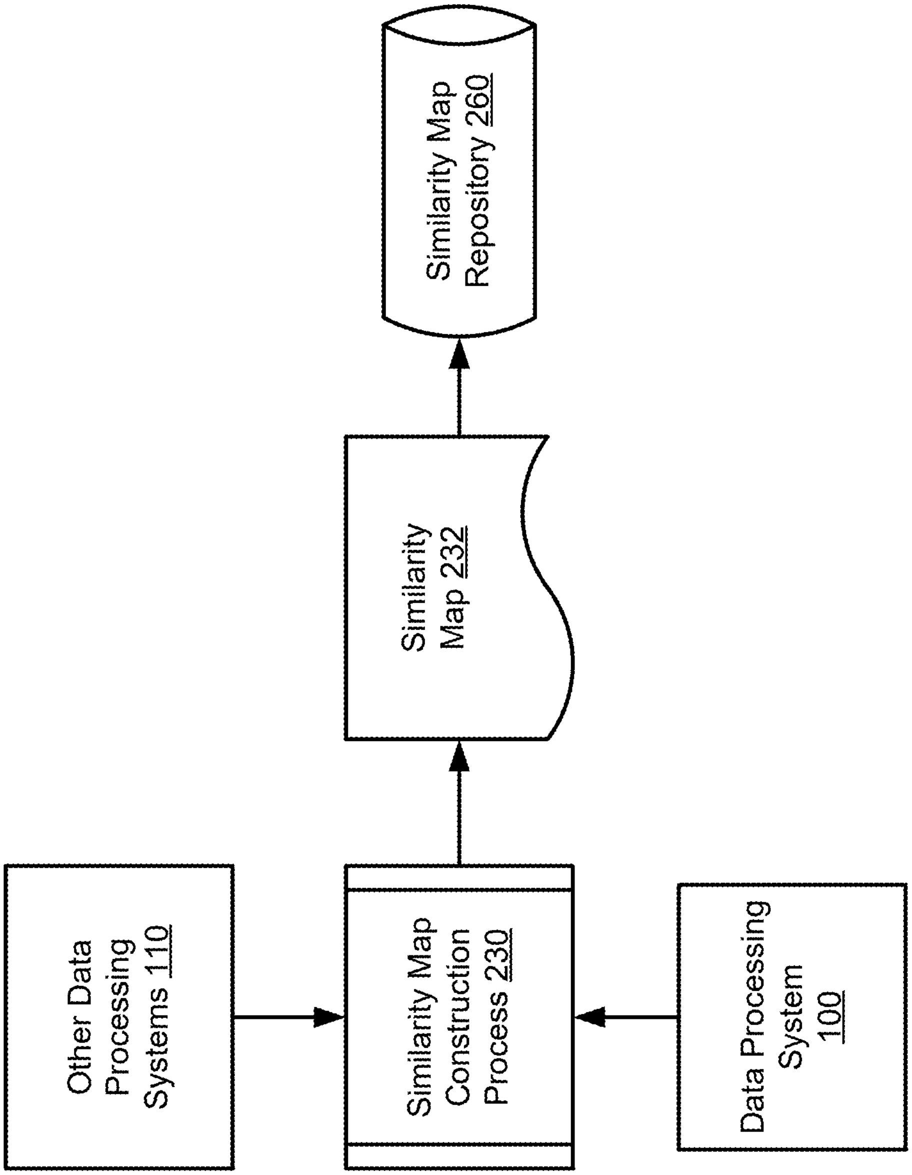

Turning to FIG. 2B, a second data flow diagram in accordance with an embodiment is shown. The second data flow diagram may illustrate data used in and data processing performed in constructing a similarity map.

To construct a similarity map, similarity map construction process 230 may be performed. During similarity map construction process 230, a data processing system (e.g., 100) in a system of data processing systems (e.g., 100, 110, etc.) may be assigned to construct the similarity map. The data processing system (e.g., 100) may be assigned by being allocated at least one task by at least one other data processing system (e.g., 110, etc.). The at least one task may be allocated to the data processing system (e.g., 100) by receiving the at least one task from the at least one other data processing system (e.g., 110, etc.). The at least one task may be received through a communication protocol of a communication system (e.g., 105) by which the at least one other data processing system (e.g., 110, etc.) communicates to the data processing system (e.g., 100). The at least one task may be sent using a message queue, a data stream, shared memory, etc.

After receiving the at least one task, the data processing system (e.g., 100) may perform the at least one task. The at least one task may include (i) obtaining a first list of each of the data processing systems (e.g., 100, 110, etc.), (ii) generating a second list of information to request from the each of the data processing systems, (iii) sending at least one request to the each of the data processing systems for the information, (iv) receiving at least one response from the each of the data processing systems, (v) populating a data structure with the information from the at least one response from the each of the data processing systems to generate the similarity map, (vi) storing the similarity map in a similarity map repository (e.g., 260).

The first list may be obtained by (i) querying a data processing system repository for the first list of all the data processing systems in the system of the data processing systems (e.g., 100, 110, etc.), (ii) sending a message to the each of the data processing systems (e.g., 100, 110, etc.), (iii) receiving a response from the each of the data processing systems (e.g., 100, 110, etc.), (iv) extracting an identification from the response, and/or (v) adding the identification to the first list.

The second list of may be generated by enumerating attributes. The attributes may include (a) device information, (b) network information, (c) configuration information, (d) workload information. The device information may include (a) a chassis identification, a port identification, a port description, a system name, a system description, at least one capability of the data processing system, etc. The network information may include (a) a virtual local area network of which the data processing system is a member, (b) a media access control address assigned to the data processing system, (c) link information between the data processing system and others of the data processing systems, etc. The configuration information may include (a) at least one central processing unit specifications, (b) a memory capacity, (c) a storage capacity, (d) at least one software specification, etc. The workload information may include (a) an average central processing unit utilization, (b) a maximum central processing unit utilization, (c) a minimum central processing unit utilization, (d) an average memory utilization, at least one application running schedules, etc.

The at least one request may be sent by transmitting the at least one request through the communication protocol of a communication system (e.g., 105) to the each of the data processing systems. The at least one request may be transmitted using the message queue, the data stream, the shared memory, etc.

The at least one response may be received by obtaining the at least one response through at least one transmission using the communication protocol of the communication system (e.g., 105) to the each of the data processing systems. The at least one response may be transmitted using the message queue, the data stream, the shared memory, etc.

The data structure may be populated by writing the attributes from the at least one response to the data structure to generate the similarity map (e.g., 232). The data structure may include a map, an array, a list, etc. The attributes may include (a) the device information, (b) the network information, (c) the configuration information, (d) the workload information, etc. of the each of the data processing systems.

In addition, for the each of the data processing systems (e.g., 100, 110, etc.), a similarity ranking may be generated and included in the similarity map (e.g., 232). The similarity ranking may include a ranking, based on the attributes of a profile, of one data processing system (e.g., 100) compared to other data processing systems (e.g., 110, etc.). For the one data processing system (e.g., 100), a high similarity ranking with a second data processing system (e.g., 110) may denote that first attributes of the data processing system (e.g., 100) and second attributes of the second data processing system (e.g., 110) are mostly, if not completely, similar. As well, a low similarity ranking with a third data processing system (e.g., not 100, not 110, etc.) may denote that first attributes of the data processing system (e.g., 100) and third attributes of the third data processing system (e.g., not 100, not 110, etc.) are mostly, if not completely, different.

Finally, the similarity map (e.g., 232) may be stored in the similarity map repository (e.g., 260). The similarity map (e.g., 232) may be stored by committing the similarity map (e.g., 232). Further, at least one revision of the similarity map (e.g., 232) may be tracked when at least one attribute of at least one data processing system of the data processing systems is modified, updated, etc. The similarity map repository (e.g., 260) may include at least one similarity map (e.g., 232) of at least one network of data processing systems (e.g., 100, 110, etc.).

Thus, via the second data flow illustrated in FIG. 2B, a system in accordance with an embodiment may construct a similarity map. Consequently, the data processing system (e.g., 100) with first attributes may be more likely to be able to provide desired computer implemented services by (i) retrieving a similarity map (e.g., 232) and (ii) conducting a search for at least a second data processing system (e.g., 110) having at least second attributes that have some measure of similarity to the first attributes.

Figure 2C:
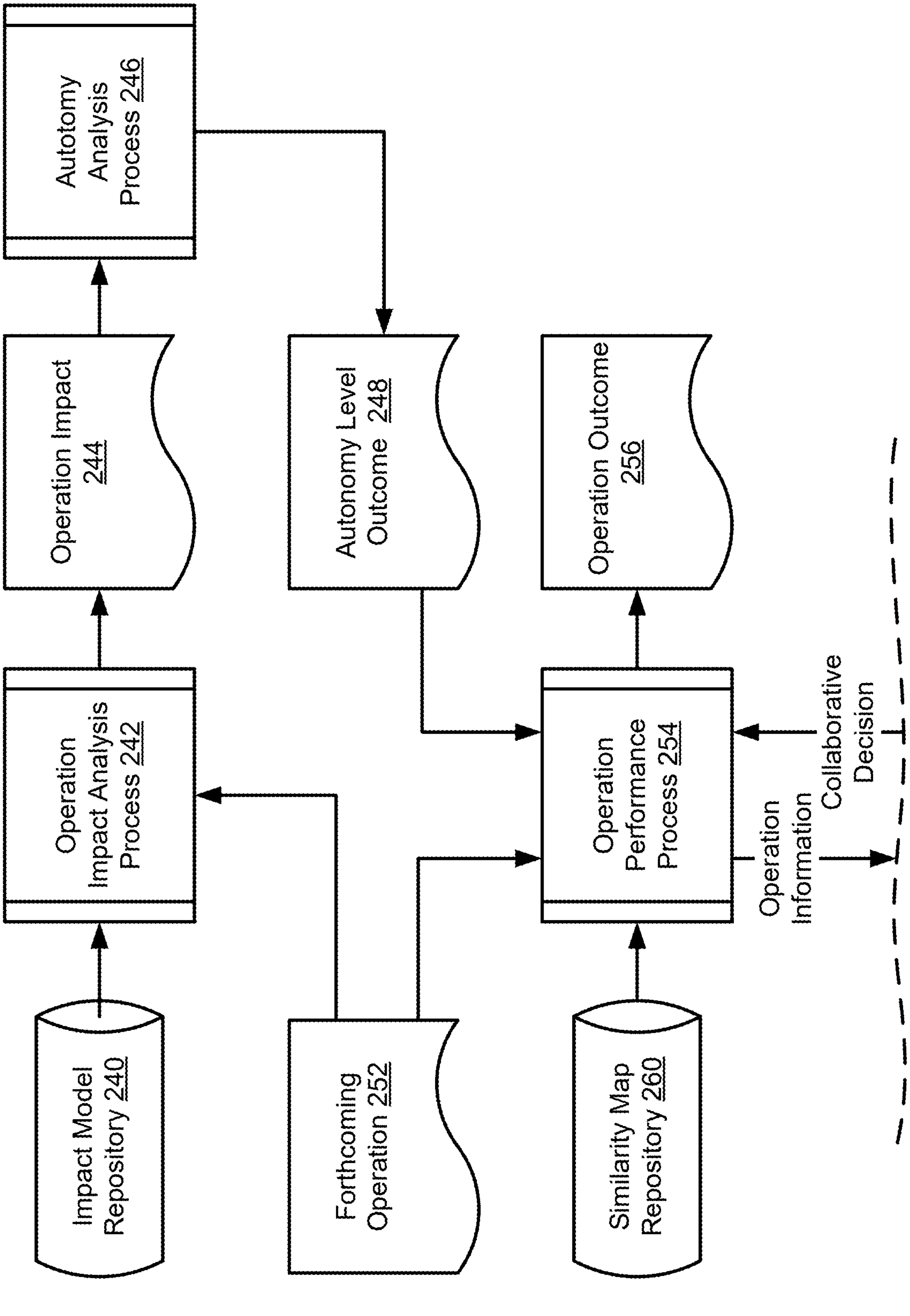

Turning to FIG. 2C, a third data flow diagram in accordance with an embodiment is shown. The third data flow diagram may illustrate data used in and data processing performed in performing, in a collaboration by at least two data processing systems, an operation.

To perform the operation, operation impact analysis process 242 may be performed. During operation impact analysis process 242, a forthcoming operation (e.g., 252) may be considered for performance by a data processing system (e.g., 100). The forthcoming operation (e.g., 252) may include (i) migrating data from a local database to a cloud database, (ii) developing a new machine learning model for at least one predictive analysis, (iii) utilizing a new data backup and recovery strategy, etc.

Depending on at least one detail of the forthcoming operation (e.g., 252), an impact model may be obtained from an impact model repository (e.g., 240). The impact model may, for example, (i) evaluate an impact of the forthcoming operation on, for example, speed and/or capacity of a data processing system that performs the forthcoming operation, (ii) evaluate the impact of adding more data processing systems to perform with an increased workload by the forthcoming operation, (iii) evaluate an impact on security of at least one data processing system that performs the forthcoming operation, etc.

During operation impact analysis process 242, after at least one impact model has been obtained from the impact model repository (e.g., 240) and/or the forthcoming operation (e.g., 252) has been selected by an administrator, the data processing system (e.g., 100), a user, etc., an impact analysis may be performed. To perform the impact analysis, at least one simulation may be conducted by the data processing system (e.g., 100) with the impact model. The simulation may ingest the forthcoming operation (e.g., 252), as well as historical data and/or current data that can be used in the forthcoming operation (e.g., 252). Further, at least one parameter (throughput, latency, response time, at least one resource, etc.) may be adjusted to vary an operation impact (e.g., 244)

The operation impact (e.g., 244) may be generated by the impact model. The outcome impact (e.g., 244) may include at least one measurable effect of performing the forthcoming operation (e.g., 252) by the data processing system (e.g., 100). Specific examples of the at least one measure effect may include (i) a measure of greenhouse gas emission, energy consumption, waste generation, etc. in a manufacturing operation, (ii) revenue change, cost savings, profit margin, etc. in a financial operation, (iii) system uptime, error frequency, new product development rates, etc. of a new technology, etc.

The operation impact (e.g., 244) may include short-term effects and/or long-term effects that occur during the forthcoming operation (e.g., 252). The short-term effects may appear at any time during the forthcoming operation (e.g., 252) and/or disappear within a short period of time. The long-term effects may appear at any time during the forthcoming operation (e.g., 252) and/or persist for a long period of the time. The short-term effects and/or the long-term effects may contribute to any variation in the operation impact (e.g., 244).

Based on the at least one measurable effect and/or the short-term effects and/or long-term effects of the operation impact (e.g., 244) autonomy analysis process 246 may be performed. During autonomy analysis process 246, an autonomy model may ingest the operation impact (e.g., 244) to determine an autonomy level outcome (e.g., 248). The autonomy level outcome (e.g., 248) may include a level of the autonomy that can be identified by granting, by an autonomy model, a measure of discretion to the data processing system (e.g., 100) in a performance of the forthcoming operation. The measure of discretion may include a less autonomous (e.g., command-driven), a partially autonomous (e.g., consensus-based), a more autonomous (e.g., self-directed), etc. performance of the forthcoming operation (e.g., 252) by the data processing system (e.g., 100). With the measure of the discretion, the autonomy model may direct how the data processing system (e.g., 100) may collaborate with at least one other data processing system (e.g., 110, etc.) of the deployment.

During autonomy analysis process 246, the autonomy model may determine the autonomy level outcome (e.g., 248) by assessing a magnitude (e.g., high, low, moderate, etc.) of the operation impact (e.g., 244). Based on the magnitude, the autonomy model may, using the autonomy level outcome (e.g., 248), direct how the data processing system (e.g., 100) may collaborate with at least one other data processing system during operation performance process 254.

The autonomy model may direct how the data processing system (e.g., 100) may collaborate by guiding the data processing system (e.g., 100) in a selection of, using a similarity map (e.g., 232) from a similarity map repository (e.g., 260), the at least one other data processing system (e.g., 110, etc.) based on a measure of similarity between the data processing system (e.g., 100) and the at least one other data processing system (e.g., 110). If the forthcoming operation (e.g., 252) has a low impact level (i.e., from the operation impact (e.g., 244)), the autonomy model may enable the data processing system (e.g., 100) to select the at least one other data processing system (e.g., 110, etc.) that is mostly similar to the data processing system (e.g., 100). However, if the forthcoming operation has a high impact level (i.e., from the operation impact (e.g., 244)), the autonomy model may enable the data processing system (e.g., 100) to select the at least one other data processing system (e.g., 110, etc.) that is similar and/or dissimilar to the data processing system (e.g., 100).

Selecting, by the data processing system (e.g., 100), the at least one other data processing system (e.g., 110, etc.) that is similar and/or dissimilar may enable the data processing system (e.g., 100) to, for example, (i) learn a diverse approach to performing the forthcoming operation, (ii) utilize different resources to perform the forthcoming operation, etc. The data processing system (e.g., 100) may, for example, (i) learn the diverse approach, (ii) utilize the different resources, etc. by (i) passing operation information to the at least one other data processing system (e.g., 110, etc.) and/or (ii) reaching at least one collaborative decision with the at least one other data processing system (e.g., 110, etc.).

In a collaboration with the at least one other data processing system (e.g., 110, etc.) for performance of the forthcoming operation (e.g., 252), operation outcome (e.g., 256) may be generated. The operation outcome (e.g., 256) may include the at least one measurable effect (which may be included in the operation impact (e.g., 244)) and/or at least one result of performing the forthcoming operation (e.g., 252) by the data processing system (e.g., 100) and/or the at least one other data processing system (e.g., 110, etc.). However, by performing the forthcoming operation (e.g., 252) in the collaboration, the at least one measurable effect (from the operation impact (e.g., 244)), at least one short-term effect and/or at least one long-term effect of the forthcoming operation (e.g., 252) may not be observed.

The at least one measurable effect (from the operation impact (e.g., 244)), the at least one short-term effect and/or the at least one long-term effect may not be observed because the collaboration may have resulted in a new approach to performing the forthcoming operation (e.g., 252).

For example, a first data processing system (e.g., 100) may perform spam detection of incoming e-mails for a business using certain keywords. However, an approach using basic keyword detection to filter e-mails may incorrectly flag and/or trash legitimate e-mails, which can have a measurable impact on commerce in a business that uses the first data processing system (e.g., 100).

To enable for more accurate spam detection of the e-mails, a second data processing system (e.g., 110) may be used. The second data processing system (e.g., 110), selected from the similarity map (e.g., 232), may be used by (i) receiving a flagged e-mail from the first data processing system (e.g., 100) and (ii) sending the flagged e-mail to a trained inference model to generate an output. The output may include a determination of whether the flagged e-mail is spam. Further, the second data processing system (e.g., 110) may use historical e-mails, already determined to be spam, to train and/or update the inference model.

Thus, via the third data flow illustrated in FIG. 2C, a system in accordance with an embodiment may perform, in the collaboration by the at least two data processing systems, the operation. Consequently, the data processing system (e.g., 100) may be more likely to be able to provide desired computer implemented services by leveraging combined computational resources of data processing systems.

To further clarify embodiments disclosed herein, interactions diagrams in accordance with an embodiment are shown in FIGS. 2D-2E and 2I-2J. These interactions diagrams may illustrate how data may be obtained and used within the system of FIGS. 2D-2E and 2I-2J.

In the interaction diagrams, processes performed by and interactions between components of a system in accordance with an embodiment are shown. In the diagrams, components of the system are illustrated using a first set of shapes (e.g., 100, 280, etc.), located towards the top of each figure. Lines descend from these shapes. Processes performed by the components of the system are illustrated using a second set of shapes (e.g., 262, 272, etc.) superimposed over these lines. Interactions (e.g., communication, data transmissions, etc.) between the components of the system are illustrated using a third set of shapes (e.g., 264, 266, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 264 may occur prior to the interaction labeled as 266. However, it will be appreciated that the processes and interactions may be performed in different orders, any may be omitted, and other processes or interactions may be performed without departing from embodiments disclosed herein.

Figure 2D:
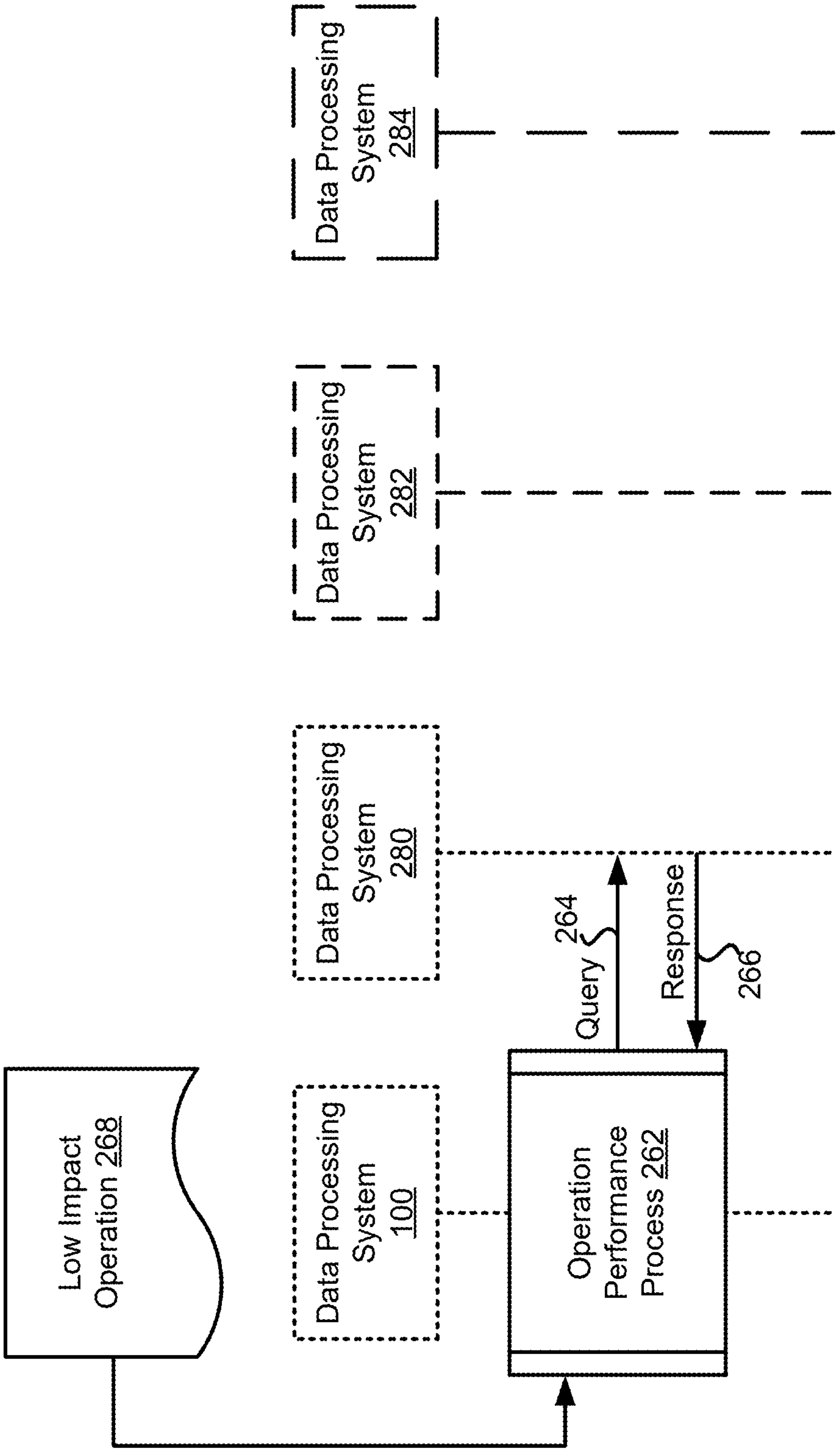
FIGS. 2D-2E and 2I-2J show interaction diagrams illustrating operation of a system in accordance with an embodiment.

Turning to FIG. 2D, a first interaction diagram in accordance with an embodiment is shown. The first interaction diagram may illustrate data used in and data processing performed in collaborating, by two data processing systems (e.g., 100, 280, etc.), to perform a low impact operation (e.g., 268).

To perform the low impact operation (e.g., 268), operation performance process 262 may be performed. During operation performance process 262, at least one task of a low impact operation (e.g., 268) may be performed by a first data processing system (e.g., 100) and/or a second data processing system (e.g., 280). The at least one task may be included in the low impact operation because the at least one task may consume minimal resources (e.g., memory, storage, etc.) of a system, have a negligible operation impact (e.g., 244) on a functionality of the system, etc.

Because the at least one task may consume minimal resources (e.g., the memory, the storage, etc.), have the negligible operation impact (e.g., 244), etc., performance of the at least one task may be assigned to the first data processing system (e.g., 100) and/or the second data processing system (e.g., 280). An assignment of the first data processing system (e.g., 100) and/or the second data processing system (e.g., 280) may be performed using a similarity map (e.g., 232) and/or at least one autonomy model.

According to the similarity map (e.g., 232), the first data processing system (e.g., 100) may have first attributes that may be similar to second attributes of the second data processing system (e.g., 280). As a result of the similarity between the first attributes and the second attributes, the at least one autonomy model may direct the first data processing system (e.g., 100) to collaborate with the second data processing system (e.g., 280). Therefore, using the first attributes of the first data processing system (e.g., 100) and the second attributes of the second data processing system (e.g., 280), each data processing system may (i) learn a less diverse approach to performing the low impact operation (e.g., 268), (ii) utilize similar resources to perform the low impact operation (e.g., 268), etc.

Using an example from the description of FIG. 2C, the first data processing system (e.g., 100) may perform spam detection of incoming e-mails for a business using certain keywords. However, an approach using basic keyword detection to filter e-mails may incorrectly flag and/or trash legitimate e-mails, which can have a measurable (e.g., a low, in this case) impact on commerce in a business that uses the first data processing system (e.g., 100).

To enable for more accurate spam detection of the e-mails, a second data processing system (e.g., 280) may be used. The second data processing system (e.g., 280), selected from the similarity map (e.g., 232), may be used by (i) receiving (e.g., 264) a flagged e-mail from the first data processing system (e.g., 100) and (ii) sending the flagged e-mail to a trained inference model to generate an output. The output may include a determination of whether the flagged e-mail is spam. The output may be sent (e.g., 266) from the second data processing system (e.g., 280) to the first data processing system (e.g., 100). Further, the second data processing system (e.g., 280) may use historical e-mails, already determined to be spam, to train and/or update the inference model.

Thus, via the first interaction illustrated in FIG. 2D, a system in accordance with an embodiment may collaborate, by two data processing systems (e.g., 100, 280, etc.), to perform the low impact operation (e.g., 268). Consequently, the data processing system (e.g., 100) may be more likely to be able to provide desired computer implemented services by leveraging combined computational resources of few data processing systems (e.g., 100, 280, etc.) with similar attributes.

Figure 2E:
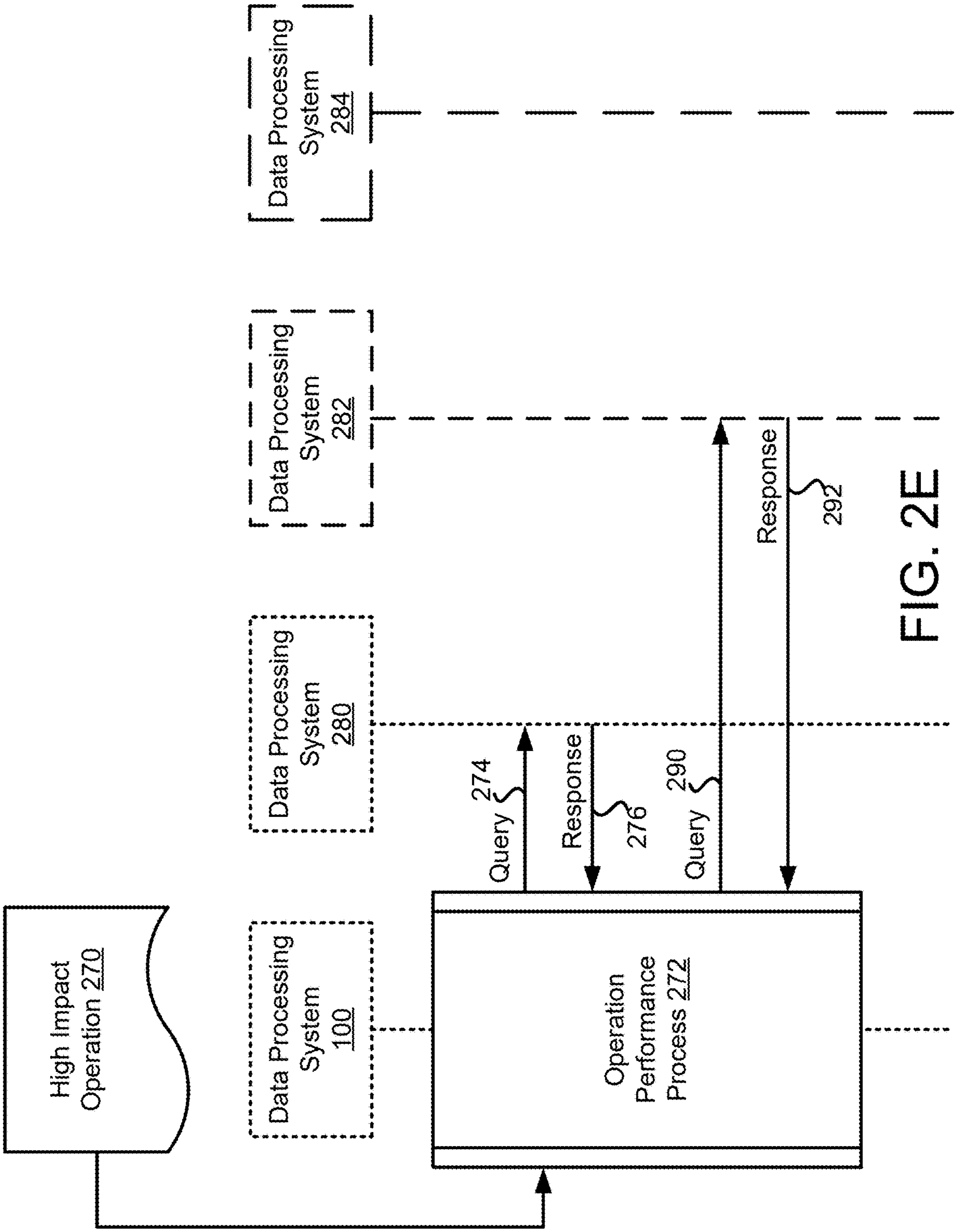

Turning to FIG. 2E, a second interaction diagram in accordance with an embodiment is shown. The second interaction diagram may illustrate data used in and data processing performed in collaborating, by three data processing systems (e.g., 100, 280, 282 etc.), to perform a high impact operation (e.g., 270).

To perform the high impact operation (e.g., 270), operation performance process 272 may be performed. During operation performance process 272, at least one task of a high impact operation (e.g., 270) may be performed by a first data processing system (e.g., 100), a second data processing system (e.g., 280), and/or a third data processing system (e.g., 282). The at least one task may be included in the high impact operation (e.g., 270) because the at least one task may consume significant resources (e.g., memory, storage, etc.) of a system, have a substantial operation impact (e.g., 244) on a functionality of the system, etc.

Because the at least one task may consume significant resources (e.g., the memory, the storage, etc.), have the substantial operation impact (e.g., 244), etc., performance of the at least one task may be assigned to the first data processing system (e.g., 100), the second data processing system (e.g., 280), and/or the third data processing system (e.g., 282). An assignment of the first data processing system (e.g., 100), the second data processing system (e.g., 280), and/or the third data processing system (e.g., 282) may be performed using a similarity map (e.g., 232) and/or at least one autonomy model.

According to the similarity map (e.g., 232), the first data processing system (e.g., 100) may have first attributes that may be similar to second attributes of the second data processing system (e.g., 280). As a result of the similarity between the first attributes and the second attributes, the at least one autonomy model may direct the first data processing system (e.g., 100) to collaborate with the second data processing system (e.g., 280). Therefore, using the first attributes of the first data processing system (e.g., 100) and the second attributes of the second data processing system (e.g., 280), each data processing system may (i) learn a less diverse approach to performing the high impact operation (e.g., 270), (ii) utilize similar resources to perform the high impact operation (e.g., 270), etc.

Likewise, according to the similarity map (e.g., 232), the first data processing system (e.g., 100) may have the first attributes that may be dissimilar from third attributes of the third data processing system (e.g., 282). As a result of the dissimilarity between the first attributes and the third attributes, the at least one autonomy model may direct the first data processing system (e.g., 100) to also collaborate with the third data processing system (e.g., 282). Therefore, using the first attributes of the first data processing system (e.g., 100) and/or the third attributes of the third data processing system (e.g., 282), each data processing system may (i) learn a more diverse approach to performing the high impact operation (e.g., 270), (ii) utilize different resources to perform the high impact operation (e.g., 270), etc.

For example, the high impact operation (e.g., 270) may include fraud detection in at least one financial transaction. To perform the fraud detection, the first data processing system (e.g., 100), the second data processing system (e.g., 280), and/or the third data processing system (e.g., 282) may collaborate during operation performance process 272.

During operation performance process 272, the first data processing system (e.g., 100) may collect transaction data from at least one automated telling machines (ATM), at least one point-of-sale system, at least one online banking platform, etc. The first data processing system (e.g., 100) may send (e.g., 274) the transaction data to the second data processing system (e.g., 280). The second data transaction system (e.g., 280) may receive the transaction data and/or use rule-based algorithms to analyze the transaction data for at least one fraud pattern (e.g., multiple transactions in quick succession, large cash withdrawals, etc.) to generate flagged transaction data. The second data processing system (e.g., 280) may send (e.g., 276) the flagged transaction data to the first data processing system (e.g., 100).

Upon receiving the flagged transaction data, the first data processing system (e.g., 100) may send (e.g., 290) the flagged transaction data to the third data processing system (e.g., 282). The third data transaction system (e.g., 282) may receive the flagged transaction data and send the flagged transaction data to a trained machine learning model. The trained machine learning model may ingest the flagged transaction data and generate the output. The output may include at least one detailed risk score and/or at least one insight into the flagged transaction data. The third data transaction system (e.g., 282) may receive the output from the trained machine learning model and send (e.g., 292) the output to the first data processing system (e.g., 100). Upon receiving the output, the first data processing system (e.g., 100) may ingest the output and generate, based on the output, at least one action. The at least one action may include (i) altering at least one customer, (ii) blocking at least one fraudulent transaction, (iii) notifying at least one law enforcement agency, etc.

Thus, via the second interaction illustrated in FIG. 2E, a system in accordance with an embodiment may collaborating, by the three data processing systems (e.g., 100, 280, 282, etc.), to perform the high impact operation (e.g., 270). Consequently, the data processing system (e.g., 100) may be more likely to be able to provide desired computer implemented services by leveraging combined computational resources of more data processing systems (e.g., 100, 280, 282, etc.).

Figure 2F:
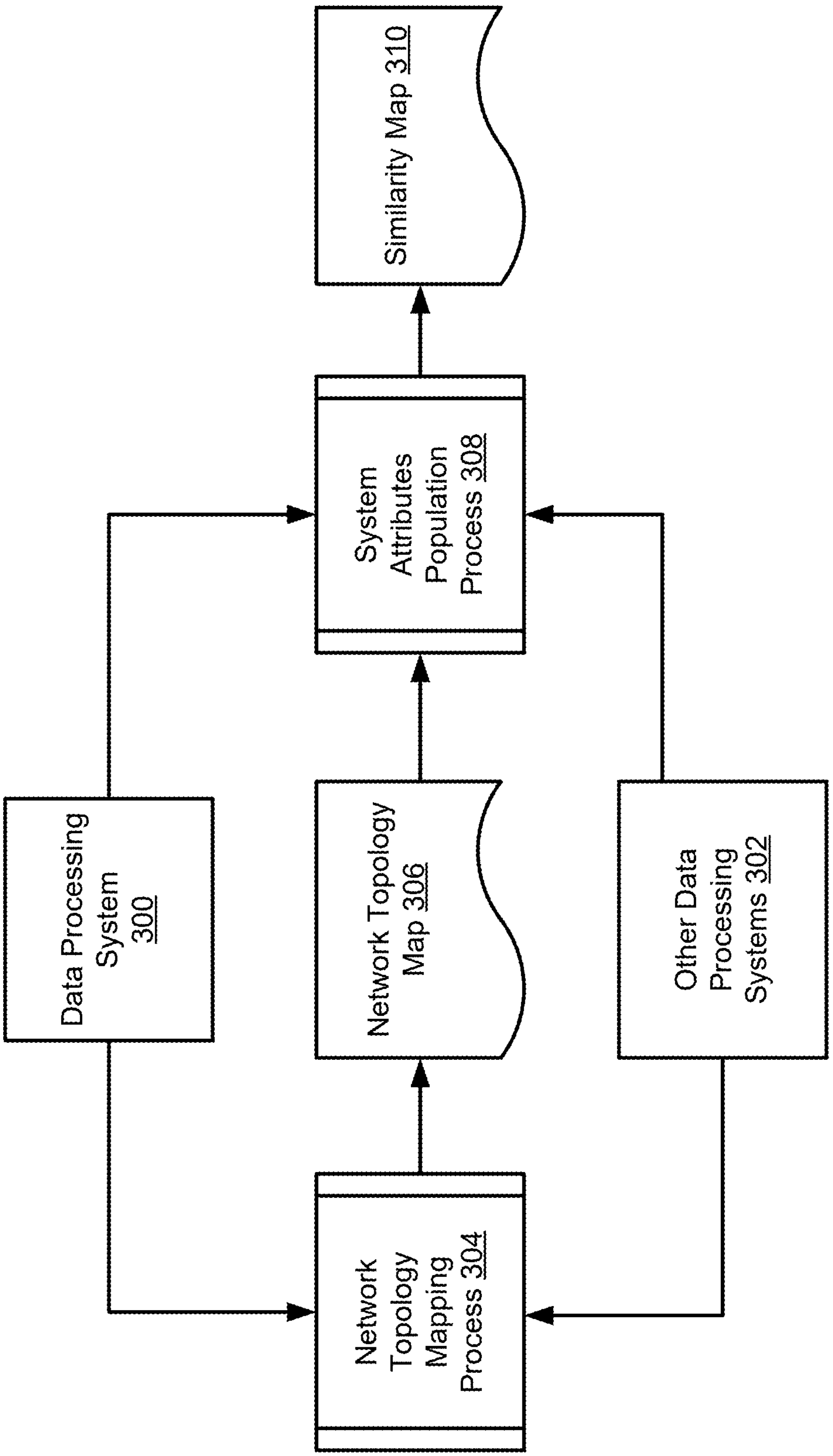

Turning to FIG. 2F, a fourth data flow diagram in accordance with an embodiment is shown. The fourth data flow diagram may illustrate data used in and data processing performed in generating a similarity map.

To generate the similarity map, network topology mapping process 304 may be performed. During network topology mapping process 304, a network administrator may first configure a network discovery tool (e.g., SolarWinds Network Performance Monitor, ManageEngine OpManager, Auvik Network Management, etc.) in the data processing system (e.g., 100). The network discovery tool may be used to query a range of internet protocol (IP) addresses and/or use at least one network protocol (e.g., transmission control protocol (TCP), simple network management protocol (SNMP), etc.).

Once the network discovery tool has been configured, a discovery step of network topology mapping process 304 may begin. The discover step may begin when the network discovery tool sends, for example, at least one Internet Control Message Protocol (ICMP) ping request to at least one other data processing system (e.g., 110, etc.) of the deployment. The ICMP ping request may be used to ensure the other data processing system (e.g., 110) is online and/or reachable. During the ICMP ping request, the data processing system (e.g., 100) may send a data packet to the other data processing system (e.g., 110, etc.). If the other data processing system (e.g., 110, etc.) sends a response (e.g., a second data packet) to the data processing system (e.g., 100), then the data processing system (e.g., 100) may confirm that the other data processing system (e.g., 110, etc.) may be online and/or reachable.

Once the other data processing system (e.g., 110, etc.) has been confirmed to be online and/or reachable, the data processing system (e.g., 100) may use the network protocol to request first information (e.g., a media access control (MAC) address, hostnames, open ports, etc.). The data processing system (e.g., 100) may send, for example, at least one SNMP request, at least one secure shell (SSH) command, at least one hypertext transfer protocol (HTTP) request, etc. to the other data processing system (e.g., 110, etc.). The other data processing system (e.g., 110, etc.) may respond, based on at least one request for the first information, by transmitting the first information to the data processing system (e.g., 100).

The data processing system (e.g., 100) may receive the first information from the other data processing system (e.g., 110, etc.). Using the first information, the data processing system (e.g., 100) may generate a network topology map (e.g., 306) and/or populate the network topology map (e.g., 306). The network topology map (e.g., 306) may include a knowledge graph. The knowledge graph may include nodes and edges. The nodes may be used to represent the data processing system (e.g., 100) and/or the one other data processing system (e.g., 110, etc.). The edges may represent at least one connection between the data processing system (e.g., 100) and/or the one other data processing system (e.g., 110, etc.). Each node of the network topology map (e.g., 306) may be populated with the first information of the data processing system (e.g., 100) and/or the one other data processing system (e.g., 110, etc.). Each edge between the nodes may represent, between at least two data processing systems (e.g., 100, 110, etc.), (i) a physical connection, (ii) a data flow, (iii) a type of network protocol, (iv) a logical relationship (e.g., a network cluster, a data processing system grouping, etc.), (v) a security relationship (i.e., an encrypted connection, a firewall, etc.), etc.

Using the network topology map (e.g., 306), system characteristic population process 308 may be performed. During system characteristic population process 308, the data processing system (e.g., 100) may use the network protocol to request second information. The second information may include system attributes of the one other data processing system (e.g., 110, etc.). The system attributes may include (i) device information (e.g., a chassis identification, a port identification, a system name, etc.), (ii) network information (e.g., at least one interface name, at least one virtual local area network, a media access control address, etc.), (iii) configuration information (e.g., at least one central processing unit specification, at least one memory capacity, at least one storage capacity, etc.), etc.

The data processing system (e.g., 100) may send, for example, a second at least one SNMP request, a second at least one secure shell (SSH) command, a second at least one hypertext transfer protocol (HTTP) request, etc. to the other data processing system (e.g., 110, etc.). The other data processing system (e.g., 110, etc.) may respond, based on the second at least one request for the second information, by transmitting the second information to the data processing system (e.g., 100).

The data processing system (e.g., 100) may receive the second information from the other data processing system (e.g., 110, etc.). The data processing system (e.g., 100) may generate, using the second information, a similarity map (e.g., 210, 232, 310). The similarity map (e.g., 210, 232, 310) may be generated by first populating the nodes of the network topology map (e.g., 306) with the second information. The device information, the network information, the configuration information, etc. may be added to each node.

Next, edge lengths of the similarity map (e.g., 210, 232, 310) may be dynamically adjusted based on at least one attribute of between at least two data processing systems (e.g., 100, 110, etc.). A dynamic adjustment of the edge lengths may be necessary so that the at least two data processing systems (e.g., 100, 110, etc.) that are more similar may have short edge lengths whereas the at least two data processing systems (e.g., 100, 110, etc.) that are more different may have long edge lengths. In this way, nodes representing the at least two data processing systems (e.g., 100, 110, etc.) that are the more similar may be near each other.

To dynamically adjust the edge lengths, the attributes of each node (e.g., a profile) may be transformed into at least one feature vector and/or stored in the each node. A string, integer, float, category, etc. of the profile may be transformed into the at least one feature vector using (i) one-hot encoding, (ii) label encoding, (iii) word embeddings, (iv) term frequency, (v) inverse document frequency, etc. The transformation into the at least one feature vector may enable the attributes of the profile to be standardized for comparison with at least one other feature vector.

Next, at least one similarity score may be computed between each pair of nodes. The at least one similarity score may be computed using a similarity metric (e.g., a cosine between at least two vectors, a Euclidean distance between the at least two vectors, a Manhattan distance (e.g., a sum of absolute differences between components of the at least two vectors, etc.), etc.). The at least one similarity score may be normalized (e.g., to be between 0 and 1, etc.) to a range usable for an edge length to generate normalized edge lengths. Finally, the edge lengths of the similarity map (e.g., 210, 232, 310) may be adjusted to correspond to the normalized edge lengths.

The similarity map (e.g., 210, 232, 310) may now illustrate, for example, for a first node, a second node with a short edge length to the first node, followed by a third node with a longer edge length to the first node. The first node may represent a first data processing system (e.g., 100), the second node may represent the one other data processing system (e.g., 110), and/or the third node may represent a third data processing system (e.g., not 100, not 110, etc.). The short edge length may indicate the first data processing system (e.g., 100) has more similar attributes with the second data processing system (e.g., 110), whereas the longer edge length has more different attributes with the third data processing system (e.g., not 100, not 110, etc.).

Finally, a ranking may be generated, for each data processing system (e.g., 100, 110, etc.) of most similar to least similar data processing systems, The ranking may be generated, by a data processing system (e.g., 100), by (i) identifying first edges connected to a single node of the data processing system (e.g., 100) on the similarity map (e.g., 210, 232, 310), (ii) identifying second nodes that are connected to the single node using the first edges, and (iii) sorting the first edges from shortest to largest to generate a sorted list of the first edges.

Using the sorted list of the first edges, a shortest edge of the first edges may be identified, along with a second node of the second nodes, to which the shortest edge is connected. A second data processing system (e.g., 110, etc.) associated with the second node may be identified as having second attributes that are most similar to attributes of the data processing system (e.g., 100). Again, using the sorted list of the first edges, a next shortest (i.e., longer) edge of the first edges may be identified, along with a third node of the second nodes, to which the next shortest (i.e., longer) edge is connected. A third data processing system (e.g., not 100, not 110, etc.) associated with the third node may be identified as having third attributes that are next most similar to attributes of the data processing system (e.g., 100).

The second data processing system (e.g., 110, etc.), the third data processing system (e.g., not 100, not 110, etc.), etc. may be added to the ranking in the first node. Once generation of the ranking is completed, the ranking may be transformed into a feature vector to be consistent with other data of the first node.

Thus, via the fourth data flow illustrated in FIG. 2F, a system in accordance with an embodiment may generate the similarity map (e.g., 210, 232, 310). Consequently, a data processing system (e.g., 100) may be more likely to be able to provide desired computer implemented services by identifying a medium (e.g., the similarity map (e.g., 210, 232, 310)) through which to leverage resource allocation and/or data processing system capabilities with similar data processing systems that enhance collaborative performance.

Figure 2G:
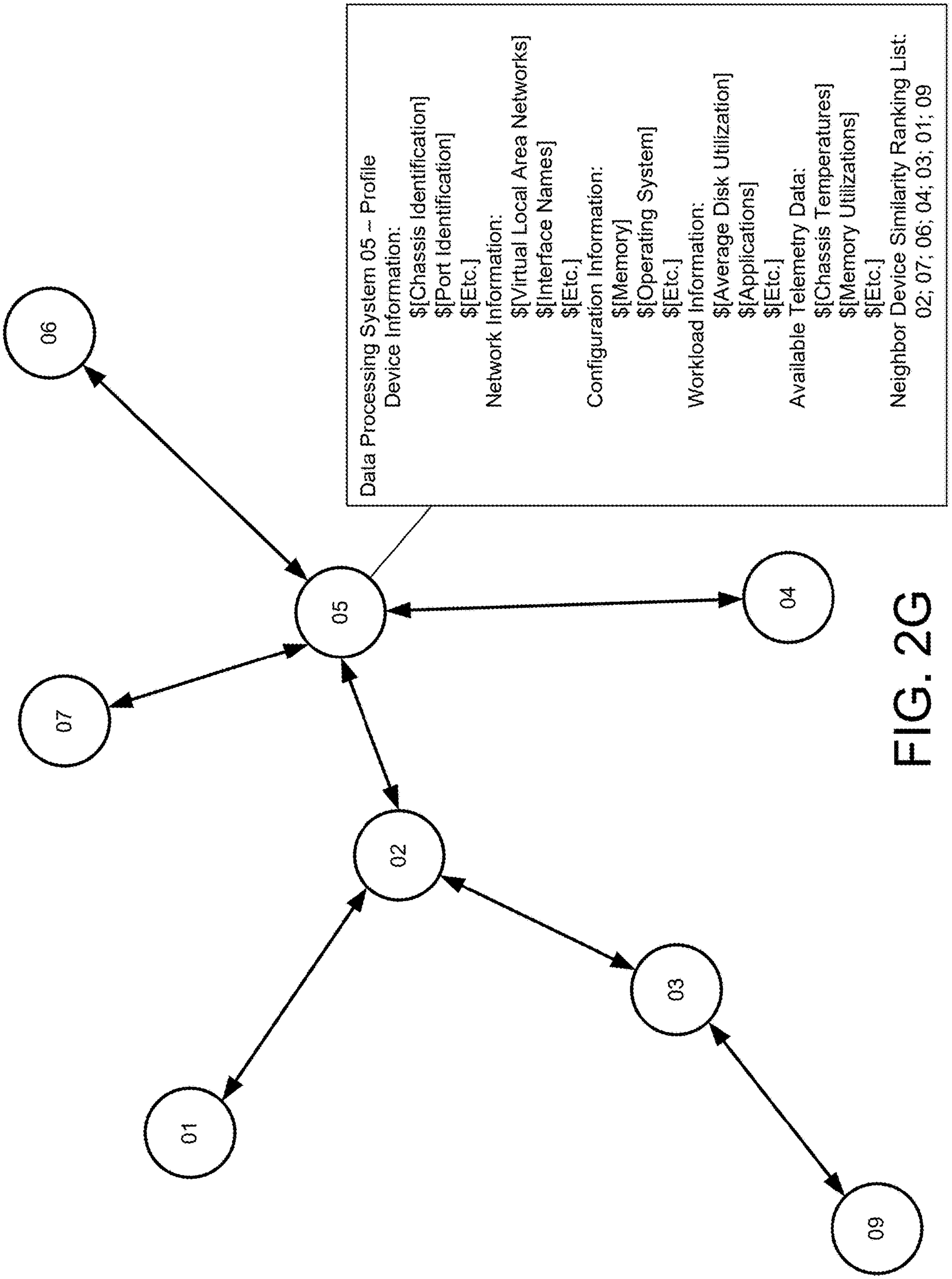
FIG. 2G shows a diagram illustrating a data structure of the system in accordance with an embodiment.

Turning to FIG. 2G, a diagram of a data structure of the system in accordance with an embodiment is shown. The diagram may illustrate a similarity map (e.g., 210, 232, 310).

The similarity map (e.g., 210, 232, 310) may include at least two nodes and at least one edge between the at least two nodes. The at least two nodes may represent at least two data processing systems (e.g., 100, 110, etc.). In FIG. 2G, the at least two data processing systems may be labeled, for example, by a number (e.g., 01, 02, 03, etc.) to indicate a data processing system (e.g., 100). The label may not be limited to a number. The label may also include a serial number, unique identification, etc.

A node of the at least two nodes may include attributes of the data processing system (e.g., 100). The attributes may be included in a profile of the data processing system (e.g., 100). The attributes of the profile may include (i) device information, (ii) network information, (iii) configuration information, (iv) available telemetry data, etc. A similarity ranking list may be included in the node. The similarity ranking list may include a list of data processing systems, identified by the label, (in this case, the number). The list may enumerate at least one other data processing system (e.g., 110, etc.) having second attributes from, for example, most similar to least similar, compared to the attributes of the node of the data processing system (e.g., 100).

The at least one edge may also illustrate a similarity between the at least two data processing systems by a length of the at least one edge. If a first at least one edge between two first nodes is shorter than a second at least one edge between two second nodes, then the first nodes may have the attributes that are more similar than the attributes of the second nodes.

The profile, which includes at least the attributes, may be transformed into at least one feature vector. A string, integer, float, category, etc. of the profile may be transformed into the at least one feature vector using (i) one-hot encoding, (ii) label encoding, (iii) word embeddings, (iv) term frequency, (v) inverse document frequency, etc. The transformation into the at least one feature vector may enable the attributes of the profile to be standardized for comparison with at least one other feature vector. A comparison between the at least one feature vector and/or the at least one other feature vector may be done, for example, in a similarity search. The similarity search may include a search for at least one other data processing system (e.g., 110, etc.) that is similar to the data processing system (e.g., 100) and is described in the description of FIG. 2H.

Thus, via the diagram illustrated in FIG. 2G, a system in accordance with an embodiment may include the similarity map (e.g., 210, 232, 310).

Figure 2H:
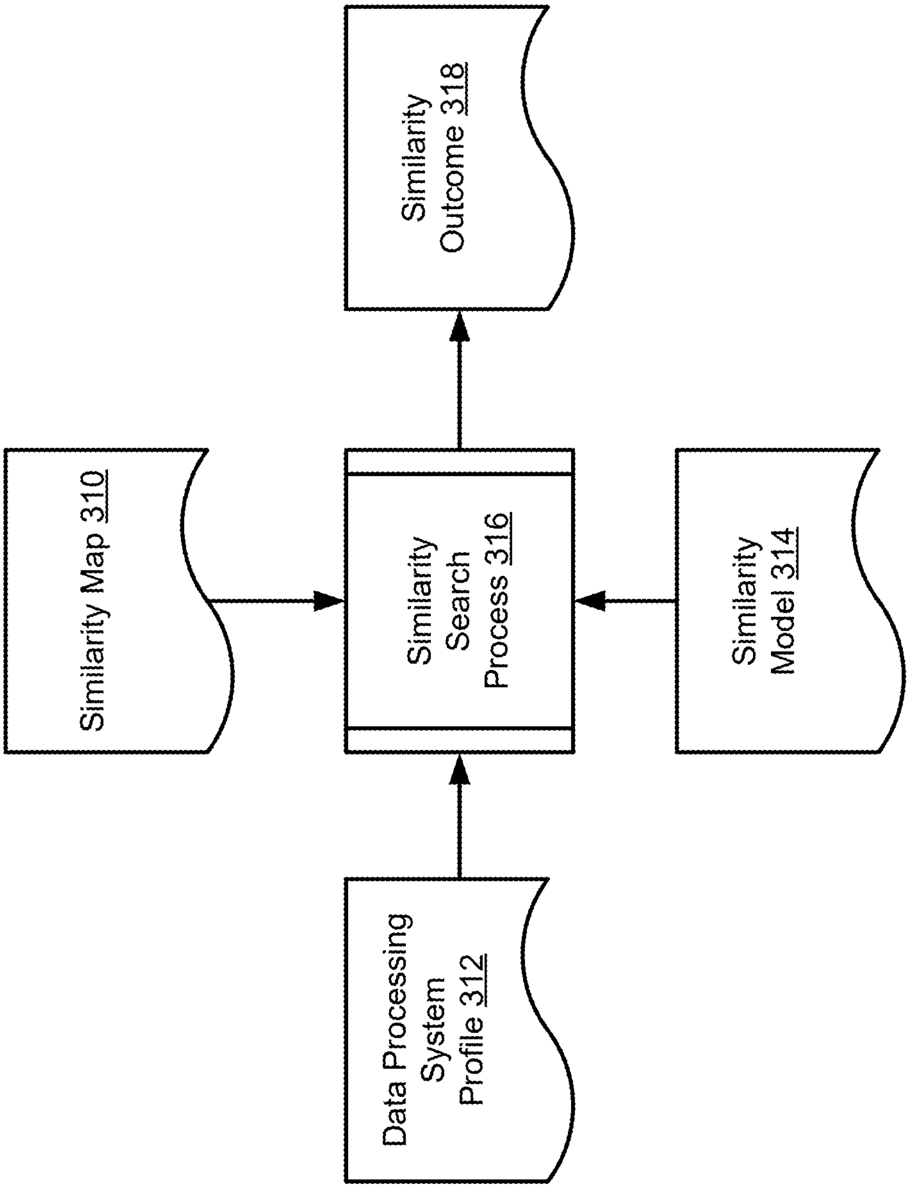

Turning to FIG. 2H, a fifth data flow diagram in accordance with an embodiment is shown. The fifth data flow diagram may illustrate data used in and data processing performed in performing a similarity search.

To perform the similarity search, similarity search process 316 may be performed. During similarity search process 316, a similarity map (e.g., 210, 232, 310), a data processing system profile (e.g., 312), and a similarity model (e.g., 314) may be ingested. Generation of the similarity map (e.g., 210, 232, 310) was described in the description of FIG. 2F and a configuration of the similarity map (e.g., 210, 232, 310) was identified in the description of FIG. 2G.

The similarity model (e.g., 314) may include (i) an inference model (e.g., a graph neural network, a machine learning model, etc.), (ii) an analytical model (e.g., a statistical model, principal component analysis, etc.), (iii) a nearest-neighbor model (e.g., a k-nearest neighbor model, an approximate nearest-neighbor technique, etc.), etc. If the inference model is used for a similarity search, the inference model may be trained using a similarity map (e.g., 210, 232, 310) included in at least one data processing system (e.g., 100, 110, etc.).

During similarity search process 316, a search for at least one other data processing system (e.g., 110, etc.) may be performed that is similar to the data processing system (e.g., 100). The similarity search may be performed by ingesting, by the similarity model (e.g., 314), a data processing system profile (e.g., 312).

The data processing system profile (e.g., 312) may include a set of input nodes and/or input edges. The input nodes may include at least one node that represents at least one data processing system (e.g., 110, etc.). The input nodes may also include at least one attribute (e.g., device information, network information, configuration information, available telemetry data, etc.). The at least one attribute may be transformed into at least one feature vector. The transformation into the at least one feature vector may enable the at least one attribute to be standardized for comparison with at least one other feature vector.

The input edges may include at least one edge that connects to the at least one node. At least one length of the input edges and/or at least one angle between two edges may be adjusted to modulate an expected similarity between at least two nodes. From a combination of the input edges and/or the input nodes, the data processing system profile (e.g., 312) may be constructed.

After ingestion of the data processing system profile (e.g., 312) by the similarity model (e.g., 314), the search may find a matching portion of the similarity map (e.g., 210, 232, 310) from the set of input nodes and/or input edges and may compute a measure of matching using a similarity metric (e.g., a cosine between at least two vectors, a Euclidean distance between the at least two vectors, a Manhattan distance (e.g., a sum of absolute differences between components of the at least two vectors, etc.), etc.), etc.

From the similarity search, similarity outcome 318 may be generated. Similarity outcome 318 may include at least one portion of the similarity map (e.g., 210, 232, 310) that matches the set of the input edges and/or the input nodes. The at least one portion of the similarity map (e.g., 210, 232, 310) may include at least one node (representing at least one other data processing system (e.g., 110, etc.)). The at least one node may include the at least one attribute (of the at least one other data processing system (e.g., 110, etc.)) that matches the attributes of the data processing system (e.g., 100). The matching between the at least one attribute and/or the attributes may not be exact, may be approximate, may include a minimum measure of error that has been allowed in the similarity search, and/or may include a closest matching of the at least one other data processing system (e.g., 110, etc.).

Thus, via the fifth data flow illustrated in FIG. 2H, a system in accordance with an embodiment may perform the similarity search. Consequently, a data processing system (e.g., 100) may be more likely to be able to provide desired computer implemented services by leveraging, based on at least one result of the similarity search, resource allocation and/or data processing system capabilities of the at least one other data processing system (e.g., 110, etc.).

Figure 2I:
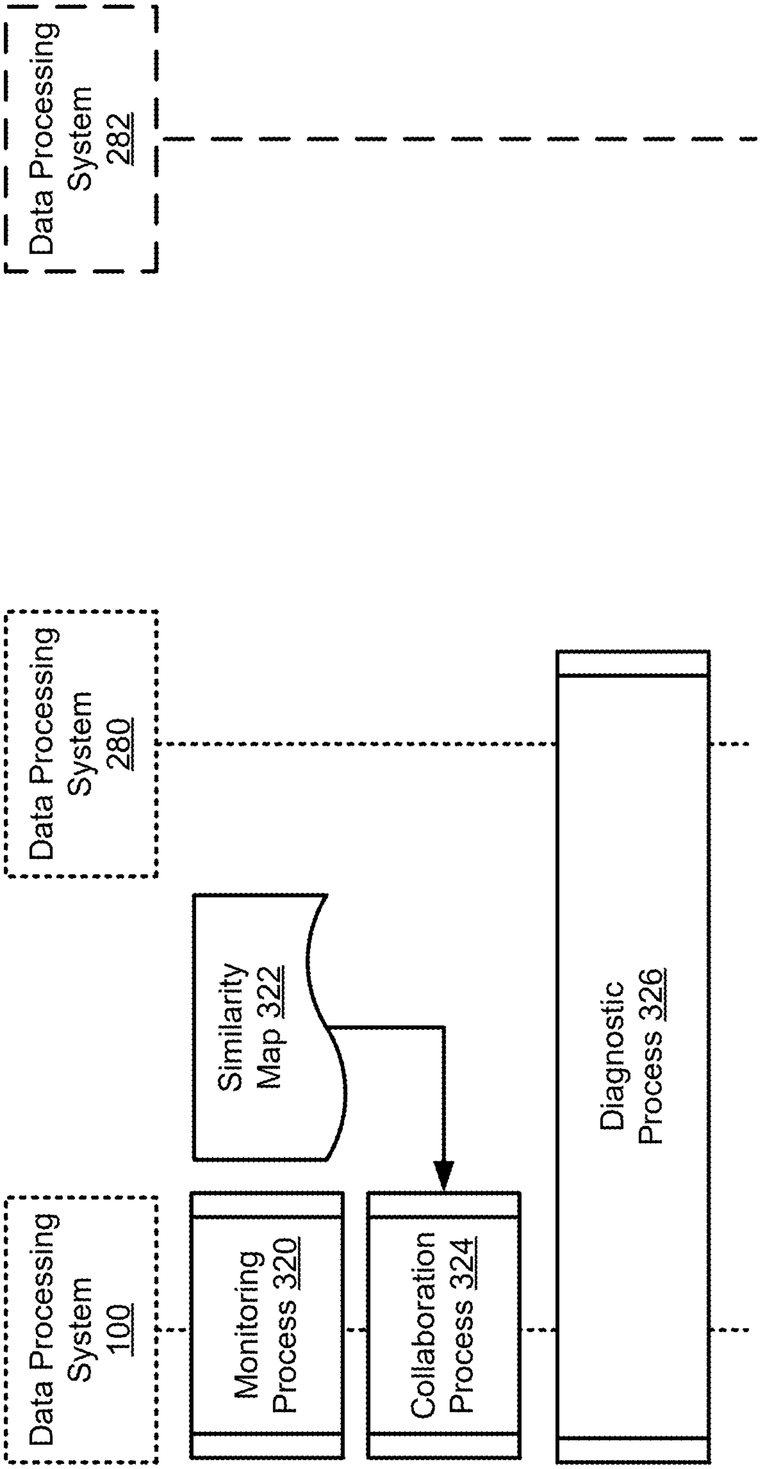

Turning to FIG. 2I, a third interaction diagram in accordance with an embodiment is shown. The third interaction diagram may illustrate data used in and data processing performed in performing a first diagnostic process.

To perform the first diagnostic process, monitoring process 320 may be performed. During monitoring process 320, a data processing system (e.g., 100) may monitor an operation for an issue. The data processing system (e.g., 100) may monitor the operation by (i) monitoring at least one performance metric (e.g., central processing unit (CPU) usage, memory usage, at least one disk input/output operation, etc.), (ii) using at least one algorithm to perform at least one anomaly detection, (iii) ingesting at least one system log to search for (a) error messages, (b) warnings, (c) critical events, etc., (iv) using an intrusion detection system to monitor for at least one security breach, etc.

While the operation is monitored, the issue may be detected. The issue may include (i) CPU overloading and/or underloading, (ii) at least one memory leak, (iii) at least one unusual behavior in the operation that suggests a presence of an anomaly, (iv) at least one security breach, etc. The issue may be detected by observing, by monitoring software, an administrator, etc. (i) the CPU overloading and/or underloading, (ii) the at least one memory leak, (iii) the at least one unusual behavior, etc.

Having detected the issue, the data processing system (e.g., 100) may attempt to generate a remediation procedure to rectify the issue. The data processing system (e.g., 100) may attempt to generate the remediation procedure by providing the issue to a large language model (LLM). The LLM may ingest the issue and generate a first output (e.g., at least one diagnosis option and/or at least one solution option, etc.). The first output may be ingested by a tree of thought model. The tree of thought model may be used to evaluate at least one outcome of the at least one diagnosis option and/or the at least one solution option to identify a solution to the issue.

However, the tree of thought model may not identify the solution. The tree of thought model may not identify the solution because the first output may not include contextual data. The contextual data may include (i) at least one performance metric, (ii) user activity data, (iii) configuration data, etc. As a result, the contextual data may provide at least one detail of the issue so that the LLM may generate a more relevant and/or accurate first output related to the issue. The relevant and/or the accurate first output may then be ingested by the tree of thought model. The tree of thought model may be used by the data processing system (e.g., 100) to decompose the relevant and/or the accurate first output to identify the at least one diagnosis option and/or the at least one solution option. The data processing system (e.g., 100) may then use the tree of thought model to identify the solution to rectify the issue.

To acquire, by the data processing system (e.g., 100), the contextual data, collaboration process 324 may be performed. During collaboration process 324, a similarity map (e.g., 322, etc.) may be ingested. From the similarity map (e.g., 322, etc.), the target node may be selected. The target node may represent the data processing system (e.g., 100) on the similarity map (e.g., 322, etc.). The target node may store a profile (i.e. self-profile) of the data processing system (e.g., 100). The profile may include (i) device information (ii) network information, (iii) configuration information, (iv) workload information, etc. The profile may be stored as at least one feature vector.

To acquire the contextual data, the target node may be ingested by a trained inference model (e.g., a graph neural network, a machine learning model, a relational graph convolution network, etc.) to generate a context embedding. The trained inference model may be trained by ingesting at least one similarity map (e.g., 322, etc.) to generate at least one association between at least one pair of nodes on the at least similarity map (e.g., 322, etc.).

The context embedding may include a representation of the target node that describes context of neighboring nodes of the target node. The neighboring nodes may include the at least one other data processing system (e.g., 280, etc.) that may have at least one attribute that is similar to a second at least one attribute of the data processing system (e.g., 100). The context may include (i) at least one communication pattern, (ii) at least one dependency relationship, (iii) at least one operating environment, (iv) at least one configuration setting, etc.

To generate the context embedding by the trained inference model (e.g., a graph neural network, a machine learning model, a relational graph convolution network, etc.), an exchange of information may take place between the target node an at least one neighboring node (e.g., at least one first nearest neighboring node, at least one second nearest neighboring node, etc.). The exchange of the information may create at least one link between the target node and the at least one neighboring node. The information may include (i) contextual data, (ii) at least one configuration, (iii) at least one process, etc. that is shared between the data processing system and/or the at least one other data processing system. The information may be used to identify the at least one other data processing system (e.g., 280, etc.).

Generation of the context embedding of the target node may be desirable in a search for the at least one other data processing system (e.g., 280, etc.). Generation of the context embedding may be desirable because the generation may use less computational resources than a similarity search that includes a sub-graph search using the similarity map (e.g., 322, etc.). Further, the trained inference model may include at least one generalization of the similarity map (e.g., 322, etc.) upon ingesting a target node. The at least one generalization may include for at least one update to the similarity map (e.g., 322, etc.).

Once the at least one other data processing system (e.g., 280, etc.) has been identified, diagnostic process 326 may be performed. During diagnostic process 326, the at least one other data processing system (e.g., 280, etc.) may provide the contextual data to the data processing system (e.g., 100). After that, the data processing system (e.g., 100) may provide the issue and/or the contextual data to the LLM. The LLM may ingest the issue and/or the contextual data and generate the relevant and/or the accurate first output. The relevant and/or the accurate first output may then be ingested by the tree of thought model.

During diagnostic process 326, a remediation procedure may be identified in a collaboration between the data processing system (e.g., 100) and/or the at least one other data processing system (e.g., 280, etc.). The remediation procedure may be identified by (i) generating, from ingestion of the relevant and/or the accurate first output by the tree of thought model, a first populated set of nodes and/or branches, (ii) selecting at least one action from each level of the nodes and/or the branches, (iii) evaluating the at least one action and/or at least one outcome of the nodes and/or the branches, and (v) selecting, from the at least one action and/or the at least one outcome, the remediation procedure.

Finally, remediation process 334 may be performed. During remediation process 334, the data processing system (e.g., 100) may perform the remediation procedure. The data processing system (e.g., 100) may perform the remediation procedure by performing at least one task of the remediation procedure. The at least one task may be used to rectify the issue of the operation.

Thus, via the third interaction illustrated in FIG. 2I, a system in accordance with an embodiment may perform the first diagnostic process. Consequently, the data processing system (e.g., 100) may be more likely to be able to provide desired computer implemented services by using context embedding of a target node of the data processing system (e.g., 100) to select the at least one other data processing system (e.g., 280, etc.) with which to collaborate to rectify the issue of the operation.

Figure 2J:
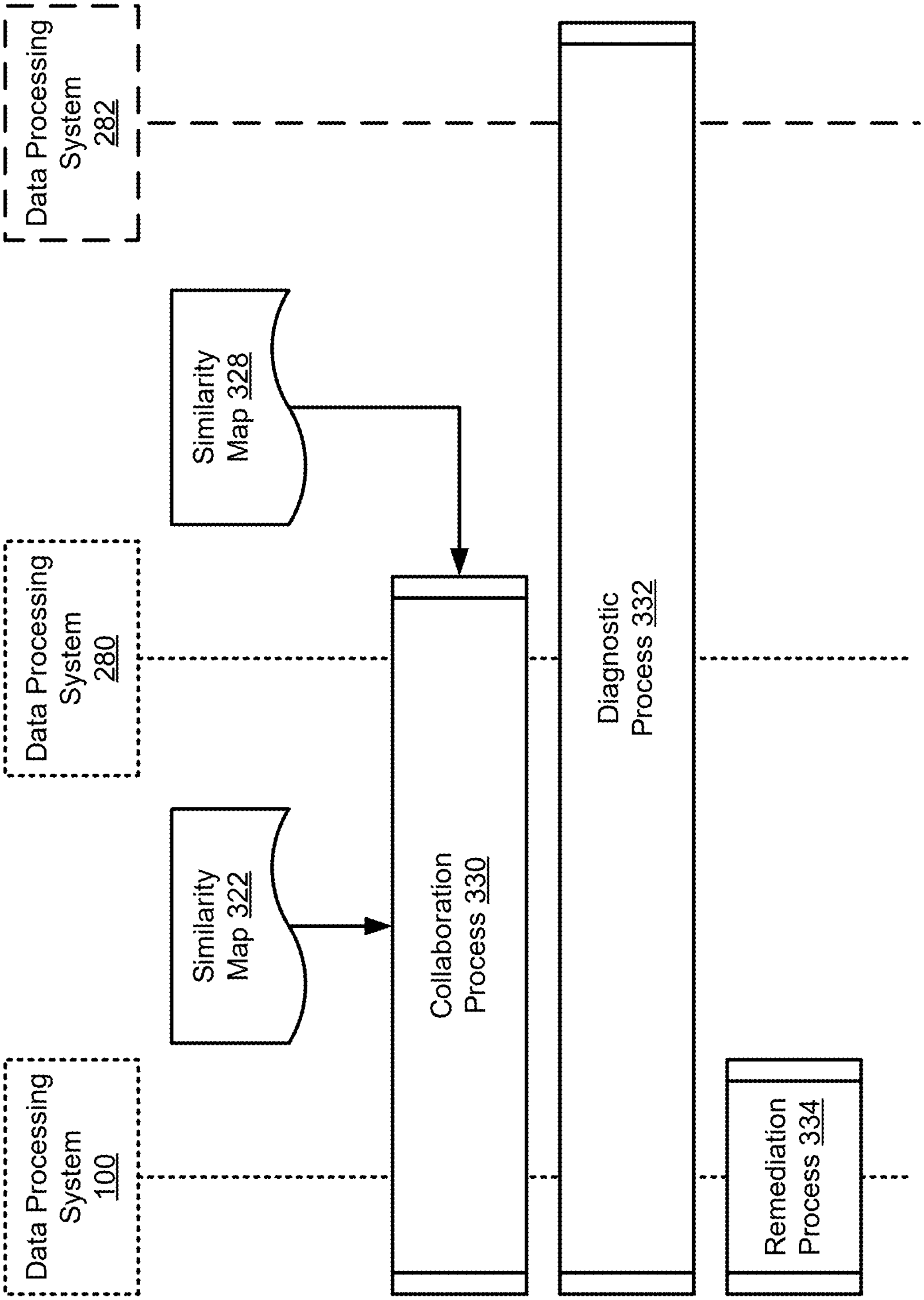

Turning to FIG. 2J, a fourth interaction diagram in accordance with an embodiment is shown. The fourth interaction diagram may illustrate data used in and data processing performed in performing a second diagnostic process.

To perform the second diagnostic process, collaboration process 330 may be performed. Collaboration process 330 may be performed because, during diagnostic process 326 illustrated in FIG. 2I, the solution to rectify the issue of the operation may not have been identified. The solution may not have been identified because the contextual data provided by the at least one other data processing system (e.g., 280, etc.) may have not generated sufficient detail in the relevant and/or the accurate first output (e.g., at least one diagnosis option and/or at least one solution option, etc.) from the LLM. Therefore, after ingesting the relevant and/or the accurate first output by the tree of thought model, the data processing system (e.g., 100) was not able to identify the solution.

During collaboration process 330, additional context data may be obtained. The additional context data may be obtained be generated additional context embedding. The additional context embedding may be generated by ingesting, by the trained inference model (e.g., a graph neural network, a machine learning model, a relational graph convolution network, etc.), at least one similarity map (e.g., 322, etc.) and/or a second similarity map (e.g., 328, etc.). The at least one similarity map may be stored by the data processing system (e.g., 100) and the second similarity map may be stored by the at least one other data processing system (e.g., 280, etc.).

After ingesting the at least one similarity map (e.g., 322, etc.) and/or a second similarity map (e.g., 328, etc.), a target node representing the data processing system (e.g., 100) as well as at least one second target node representing the at least one other data processing system (e.g., 280, etc.) may be selected. The target node may be selected from the at least one similarity map (e.g., 322, etc.) and/or a second similarity map (e.g., 328, etc.). Between the target node, the at least one second target node, and/or at least one neighboring node (e.g., beyond at least one first nearest neighboring node, beyond at least one second nearest neighboring node, etc.). an exchange of information may take place. The exchange of the information may create at least one link between the target node, the at least one second target node, and/or the at least one neighboring node. The information may include (i) the additional contextual data, (ii) at least one different configuration, (iii) at least one different process, etc. From the link, the additional context embedding may be generated. From the additional context embedding, a second at least one other data processing system (e.g., 282, etc.) may be identified.

After identifying the second at least one other data processing system, (e.g., 282, etc.), diagnostic process 332 may be performed. During diagnostic process 332, the second at least one other data processing system (e.g., 282, etc.) may provide the additional contextual data to the data processing system (e.g., 100). As well, the at least one other data processing system (e.g., 280, etc.) may provide the contextual data to the data processing system (e.g., 100). The data processing system (e.g., 100) may provide the issue, the contextual data, and/or the additional contextual data to the LLM. The LLM may ingest the issue, the contextual data, and/or the additional contextual data and generate a relevant and/or accurate second output (e.g., at least one second diagnosis option and/or at least one second solution option, etc.). The relevant and/or the accurate second output may then be ingested by the tree of thought model.

During diagnostic process 332, a second remediation procedure may be identified in a second collaboration between the data processing system (e.g., 100), the at least one other data processing system (e.g., 280, etc.), and/or the second at least one other data processing system (e.g., 282, etc.). The second remediation procedure may be identified by (i) generating, from ingestion of the relevant and/or the accurate second output by the tree of thought model, a second populated set of nodes and/or branches, (ii) selecting at least one second action from each level of the nodes and/or the branches, (iii) evaluating the at least one second action and/or at least one second outcome of the nodes and/or the branches, and (v) selecting, from the at least one second action and/or the at least one second outcome, the second remediation procedure.

Finally, remediation process 334 may be performed. During remediation process 334, the data processing system (e.g., 100) may perform the second remediation procedure. The data processing system (e.g., 100) may perform the second remediation procedure by performing at least one task of the second remediation procedure. The at least one task may be used to rectify the issue of the operation.

Thus, via the fourth interaction illustrated in FIG. 2J, a system in accordance with an embodiment may perform the second diagnostic process. Consequently, the data processing system (e.g., 100) may be more likely to be able to provide desired computer implemented services by using context embedding of a target node of the data processing system (e.g., 100) to select the second at least one other data processing system (e.g., 282, etc.) with which to collaborate to rectify the issue of the operation.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
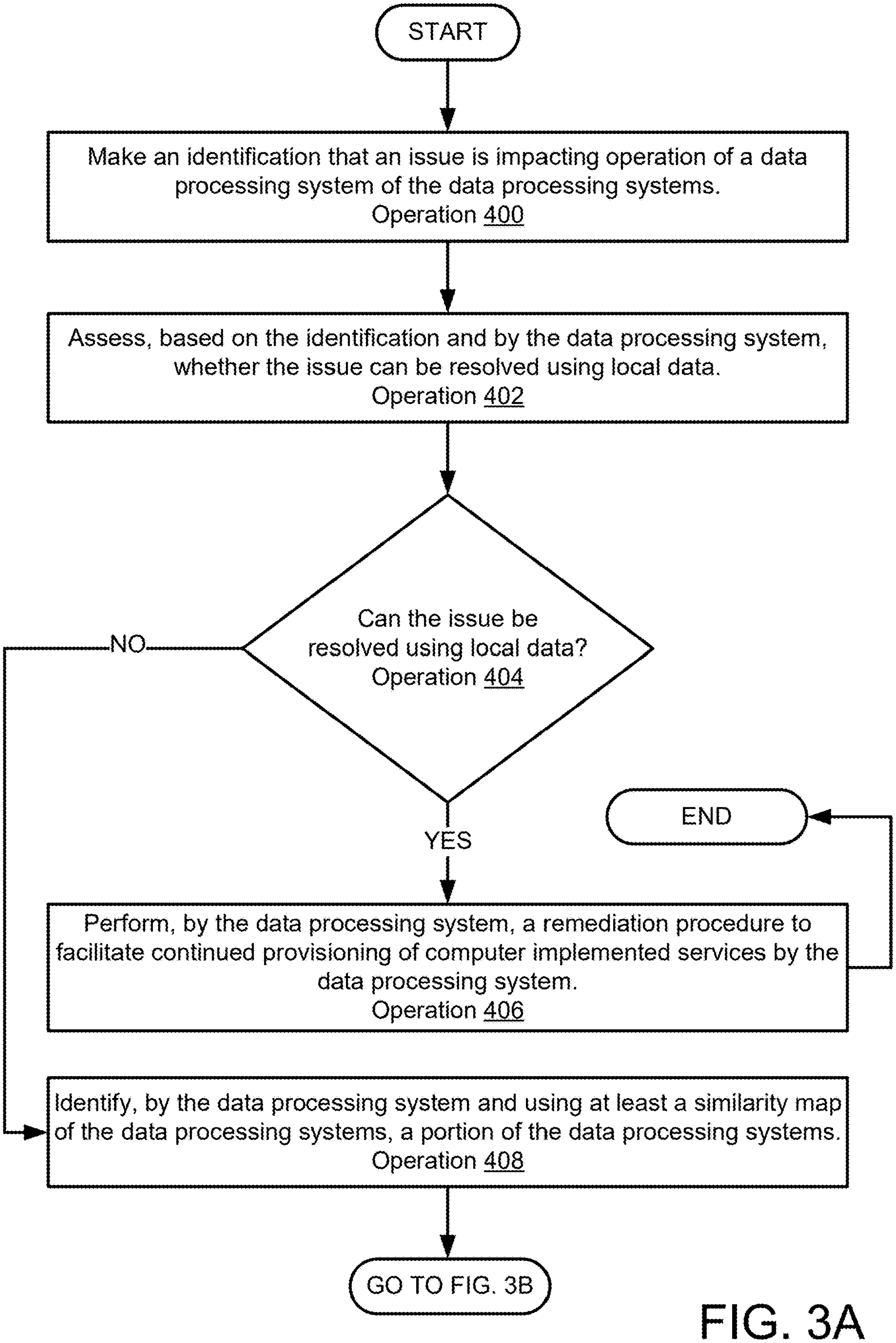
FIGS. 3A-3B show flow diagrams illustrating at least one method in accordance with an embodiment.
Figure 3B:
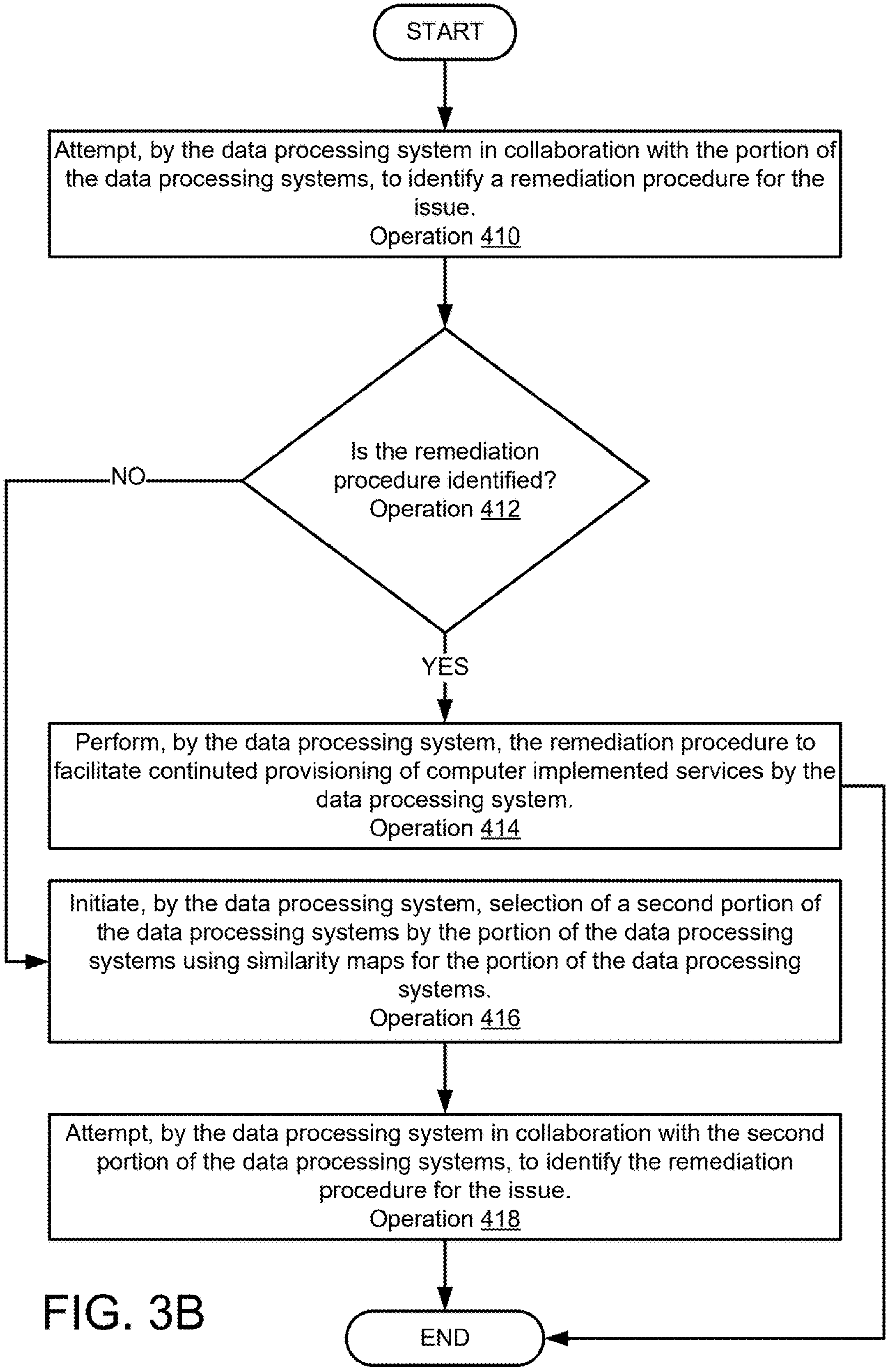

As discussed above, the components of FIG. 1 may perform various methods to manage operation of a deployment comprising data processing systems. FIGS. 3A-3B illustrate a method that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method of managing the operation of the deployment comprising the data processing systems in accordance with an embodiment is shown. The method may be performed, for example, by any of the components of the system of FIG. 1, and/or other components not shown therein.

At operation 400, an identification may be made that an issue is impacting operation of a data processing system of the data processing systems. The identification may be made by monitoring, by monitoring software, an administrator, etc. the operation and/or observing, for example, (i) CPU overloading and/or underloading, (ii) at least one memory leak, (iii) at least one unusual behavior in the operation that suggests a presence of an anomaly, (iv) at least one security breach, etc.

At operation 402, whether, based on the identification and/or by the data processing system, the issue can be resolved using local data may be assessed. Whether the issue may be resolved using the local data may be assessed by (i) ingesting, by a large language model (LLM), the local data and/or the issue to generate a first LLM output (e.g., at least one diagnosis option and/or at least one solution option, etc.), (ii) populating, by the data processing system and using the first LLM output, a tree of thought model, and/or (iii) tracing at least one first path through first nodes and/or first branches of the tree of thought model from the an initial state (e.g., the issue) to determine a first solution.

At operation 404, a determination may be made whether the issue can be resolved using the local data. The determination may be made by assessing an effectiveness of the first solution being used by the data processing system to rectify the issue. If the first solution has been assessed to be effective to rectify the issue, then the method may continue at operation 406. However, if the first solution has been assessed to not be effective to rectify the issue, then the operation may continue at operation 408.

Continuing from operation 404, at operation 406, a remediation procedure (e.g., the first solution) may be performed, by the data processing system, to facilitate continued provisioning of computer implemented services by the data processing system. The remediation procedure (e.g., the first solution) may be performed by performing at least one task of the remediation procedure to rectify the issue.

The method may end following operation 406.

Continuing from operation 404, at operation 408, a portion of the data processing systems may be identified by the data processing system and using at least a similarity map of the data processing systems. The portion of the data processing systems may be identified by ingesting a target node (representing the data processing system) by a trained inference model (e.g., a graph neural network, a machine learning model, a relational graph convolution network, etc.) to generate context embedding of the target node. The context embedding may include an identification of at least one other data processing system of the portion of the data processing systems.

Continuing from FIG. 3B, at operation 410, the data processing system in collaboration with the portion of the data processing systems may attempt to identify the remediation procedure (e.g., a second solution). The data processing system in collaboration with the portion of the data processing systems may attempt to identify the remediation procedure (e.g., the second solution) by (i) generating a tree of thought to guide prompting of large language models (LLMs) hosted by the portion of the data processing systems to attempt to identify the remediation procedure for the issue, (ii) at least partially distribute portions of the tree of thought for evaluation by the portion of the data processing systems to obtain a plurality of partial processing results, (iii) aggregating the partial processing results to obtain a global processing result, and (iv) using the global processing result as the remediation procedure (e.g., the second solution).

The tree of thought may be generated by (i) ingesting, by the LLM, the local data, contextual data from the portions of the data processing systems, and/or the issue to generate a second LLM output (e.g., at least one second diagnosis option and/or at least one second solution option, etc.), (ii) populating, by the data processing system and using the second LLM output, the tree of thought model. The portions of the tree of thought may be distributed by transmitting, though a communication protocol of the data processing systems, at least one portion of the portions of the tree of thought to the at least one other data processing system of the portion of the data processing systems.

The partial processing results of the at least one other data processing system may be aggregated by transmitting, by the at least one other data processing system to the data processing system, the partial processing results using the communication protocol. The partial processing results may include at least one path through the tree of thought model between the initial state (e.g., the issue) and/or at least one second solution.

The data processing system may receive the partial processing results to determine the global processing result. The global processing result may include a path, selected by the data processing system, through the tree of thought model, that includes the initial state (e.g., the issue) and/or the at least one second solution. The global processing result may be used as the remediation procedure. The global processing result may be used by selecting, by the data processing system, the global processing result to be used as the remediation procedure to rectify the issue.

At operation 412, a determination may be made whether the remediation procedure has been identified. The determination may be made by assessing an effectiveness of the global processing result (e.g., the second solution of the at least one second solution) being used by the data processing system to rectify the issue. If the global processing result has been assessed to be effective to rectify the issue, then the method may continue at operation 414. However, if the second solution has been assessed to not be effective to rectify the issue, then the operation may continue at operation 416.

Continuing from operation 412, at operation 414, the remediation procedure (e.g., the global processing result) may be performed, by the data processing system, to facilitate continued provisioning of computer implemented services by the data processing system. The remediation procedure (e.g., the global processing result) may be performed by performing the at least one task of the remediation procedure (e.g., the global processing result) to rectify the issue.

The method may end following operation 414.

Continuing from operation 412, at operation 416, selection of a second portion of the data processing systems by the portion of the data processing systems may be initiated using similarity maps for the portion of the data processing systems. The selection may be initiated by ingesting, by a trained inference model (e.g., a graph neural network, a machine learning model, a relational graph convolution network, etc.), at least one similarity map of the similarity maps for the portion of the data processing systems. From the at least one similarity map, a target node (representing the data processing system) and/or at least one other target node (representing the at least one other data processing system of the portion of the data processing systems) may be selected. The target node and/or the at least one other target node may be used, by the trained inference model, to generate additional context embedding of the target node. The additional context embedding may include an identification of a second at least one other data processing system of the second portion of the data processing systems.

At operation 418, the data processing system in collaboration with the second portion of the data processing systems may attempt to identify the remediation procedure (e.g., a third solution) for the issue. The data processing system in collaboration with the second portion of the data processing systems may attempt to identify the remediation procedure (e.g., the third solution) by (i) ingesting, by the large language model (LLM), (a) the local data, (b) the contextual data, (c) additional contextual data from the second at least one other data processing system of the second portion of the data processing systems, (d) the issue, etc. to generate a third LLM output (e.g., at least one third diagnosis option and/or at least one third solution option, etc.), (ii) populating, by the data processing system and using the third LLM output, the tree of thought model, and (iii) tracing at least one third path through third nodes and/or third branches of the tree of thought model from the initial state (e.g., the issue) to determine the remediation procedure (e.g., the third solution).

The method may end following operation 418.

Thus, via the method shown in FIGS. 3A-3B, embodiments herein may likely improve a likelihood of managing the operation of the deployment comprising the data processing systems. By improving the likelihood of managing the operation of the deployment comprising the data processing systems, the data processing system may be more likely to provide desirable computer implemented services by, for example, using a target node, representing the data processing system, to identify a portion of similar data processing systems, collaborating, by the data processing system and/or the at least one other data processing system of the portion of similar data processing systems, to generate the remediation procedure to rectify the issue of the operation, etc.

Figure 4:
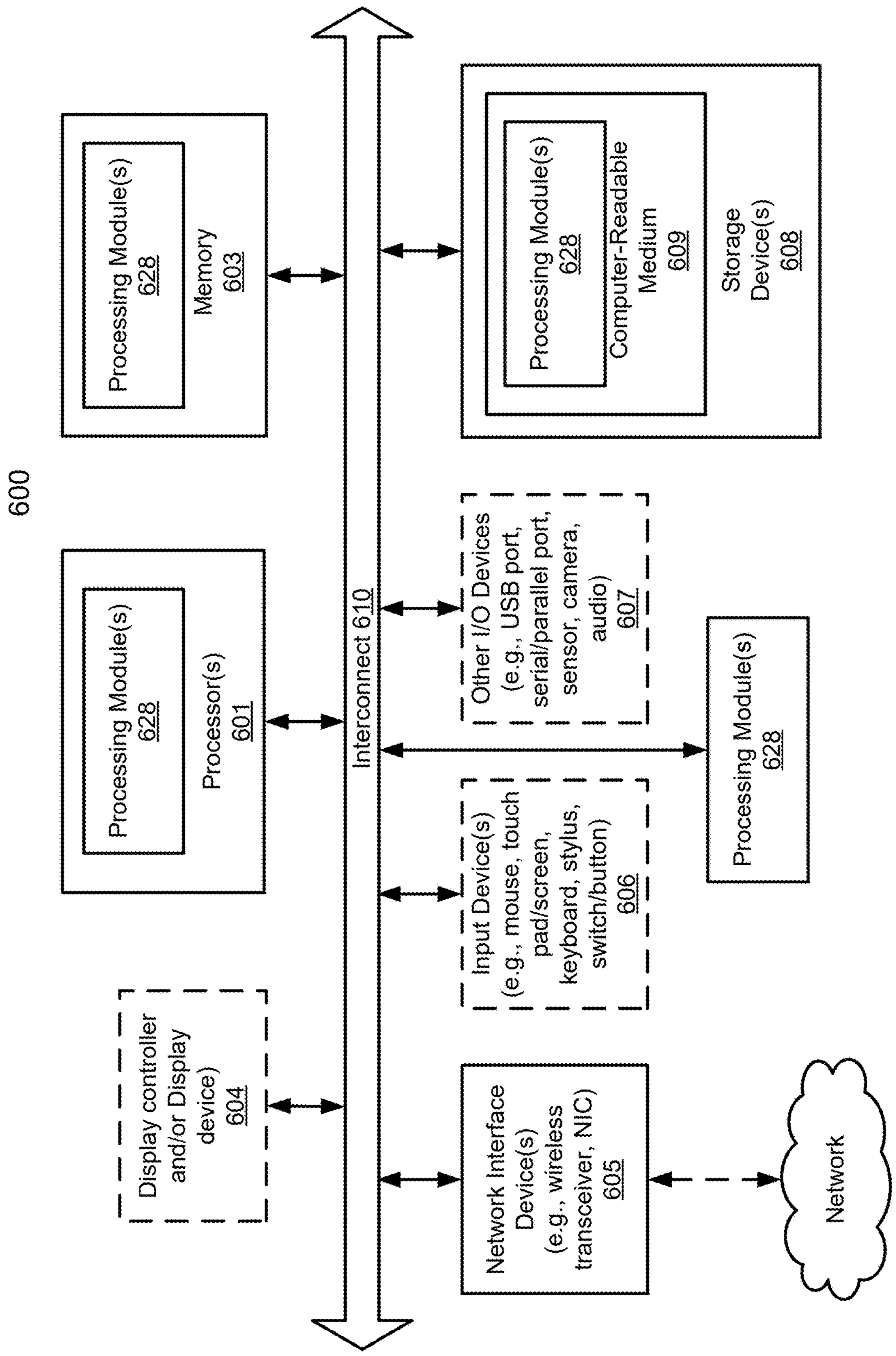
FIG. 4 shows a block diagram illustrating a data processing system in accordance with an embodiment.

Any of the components illustrated in FIGS. 1-2J may be implemented with one or more computing devices. Turning to FIG. 4, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 600 is intended to show a high level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-607 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601, which may be a low power multi-core processor socket such as an ultra-low voltage processor, may act as a main processing unit and central hub for communication with the various components of the system. Such processor can be implemented as a system on chip (SoC). Processor 601 is configured to execute instructions for performing the operations discussed herein. System 600 may further include a graphics interface that communicates with optional graphics subsystem 604, which may include a display controller, a graphics processor, and/or a display device.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a deployment comprising data processing systems, the method comprising:
- making an identification that an issue is impacting operation of a data processing system of the data processing systems;
- based on the identification:
  - assessing, by the data processing system, whether the issue can be resolved using local data;
  - in a first instance of the assessing where the issue cannot be resolved using the local data:
    - identifying, by the data processing system and using at least a similarity map of the data processing systems, a portion of the data processing systems;
    - attempting, by the data processing system in collaboration with the portion of the data processing systems, to identify a remediation procedure for the issue by:
      - generating a tree of thought to guide prompting of large language models hosted by the portion of the data processing systems to attempt to identify the remediation procedure for the issue;
      - at least partially distribute portions of the tree of thought for evaluation by the portion of the data processing systems to obtain a plurality of partial processing results;
      - aggregating the partial processing results to obtain a global processing result; and
      - using the global processing result as the remediation procedure; and
    - in a first instance of the attempting where the remediation procedure is identified:
      - performing, by the data processing system, the remediation procedure to facilitate continued provisioning of computer implemented services by the data processing system.

2. The method of claim 1, further comprising:
- in a second instance of the attempting where the remediation procedure is not identified:
  - initiating, by the data processing system, selection of a second portion of the data processing systems by the portion of the data processing systems using similarity maps for the portion of the data processing systems; and
  - attempting, by the data processing system in collaboration with the second portion of the data processing systems, to identify the remediation procedure for the issue.

3. The method of claim 1, wherein the similarity map of the data processing systems is based, at least in part, on a graph neural network trained on a knowledge graph of the data processing systems.

4. The method of claim 3, wherein the knowledge graph comprises nodes corresponding to the data processing systems and edges that are based on relationships between the data processing systems.

5. The method of claim 4, wherein each node is associated with a plurality of attributes reflecting characteristics of the respective node.

6. The method of claim 1, wherein each data processing system of the data processing systems hosts an instance of a trained large language model and a prompt enhancement system.

7. The method of claim 6, wherein the prompt enhancement system supplements prompts submitted to the trained large language model based on local data and data from at least one of the portion of the data processing systems.

8. A non-transitory machine-readable medium having instructions stored therein, which when executed by a processor, cause the processor to perform operations for managing operation of a deployment comprising data processing systems, the operations comprising:
- making an identification that an issue is impacting operation of a data processing system of the data processing systems;
- based on the identification:
  - assessing, by the data processing system, whether the issue can be resolved using local data;
  - in a first instance of the assessing where the issue cannot be resolved using the local data:
    - identifying, by the data processing system and using at least a similarity map of the data processing systems, a portion of the data processing systems;
    - attempting, by the data processing system in collaboration with the portion of the data processing systems, to identify a remediation procedure for the issue by:
      - generating a tree of thought to guide prompting of large language models hosted by the portion of the data processing systems to attempt to identify the remediation procedure for the issue;
      - at least partially distribute portions of the tree of thought for evaluation by the portion of the data processing systems to obtain a plurality of partial processing results;
      - aggregating the partial processing results to obtain a global processing result; and
      - using the global processing result as the remediation procedure; and
    - in a first instance of the attempting where the remediation procedure is identified:
      - performing, by the data processing system, the remediation procedure to facilitate continued provisioning of computer implemented services by the data processing system.

9. The non-transitory machine-readable medium of claim 8, wherein the operations further comprise:
in a second instance of the attempting where the remediation procedure is not identified:
initiating, by the data processing system, selection of a second portion of the data processing systems by the portion of the data processing systems using similarity maps for the portion of the data processing systems; and
attempting, by the data processing system in collaboration with the second portion of the data processing systems, to identify the remediation procedure for the issue.

10. The non-transitory machine-readable medium of claim 8, wherein the similarity map of the data processing systems is based, at least in part, on a graph neural network trained on a knowledge graph of the data processing systems.

11. The non-transitory machine-readable medium of claim 10, wherein the knowledge graph comprises nodes corresponding to the data processing systems and edges that are based on relationships between the data processing systems.

12. The non-transitory machine-readable medium of claim 11, wherein each node is associated with a plurality of attributes reflecting characteristics of the respective node.

13. The non-transitory machine-readable medium of claim 8, wherein each data processing system of the data processing systems hosts an instance of a trained large language model and a prompt enhancement system.

14. A data processing system, comprising:
a processor; and
a memory coupled to the processor to store instructions, which when executed by the processor, cause the processor to perform operations managing operation of a deployment comprising data processing systems, the operations comprising:
making an identification that an issue is impacting operation of the data processing system of the data processing systems;
based on the identification:
assessing, by the data processing system, whether the issue can be resolved using local data;
in a first instance of the assessing where the issue cannot be resolved using the local data:
identifying, by the data processing system and using at least a similarity map of the data processing systems, a portion of the data processing systems;
attempting, by the data processing system in collaboration with the portion of the data processing systems, to identify a remediation procedure for the issue by:
generating a tree of thought to guide prompting of large language models hosted by the portion of the data processing systems to attempt to identify the remediation procedure for the issue;
at least partially distribute portions of the tree of thought for evaluation by the portion of the data processing systems to obtain a plurality of partial processing results;
aggregating the partial processing results to obtain a global processing result; and
using the global processing result as the remediation procedure; and
in a first instance of the attempting where the remediation procedure is identified:
performing, by the data processing system, the remediation procedure to facilitate continued provisioning of computer implemented services by the data processing system.

15. The data processing system of claim 14, wherein the operations further comprise:
in a second instance of the attempting where the remediation procedure is not identified:
initiating, by the data processing system, selection of a second portion of the data processing systems by the portion of the data processing systems using similarity maps for the portion of the data processing systems; and
attempting, by the data processing system in collaboration with the second portion of the data processing systems, to identify the remediation procedure for the issue.

16. The data processing system of claim 14, wherein the similarity map of the data processing systems is based, at least in part, on a graph neural network trained on a knowledge graph of the data processing systems.

17. The data processing system of claim 16, wherein the knowledge graph comprises nodes corresponding to the data processing systems and edges that are based on relationships between the data processing systems.

18. The data processing system of claim 17, wherein each node is associated with a plurality of attributes reflecting characteristics of the respective node.

19. The data processing system of claim 14, wherein each data processing system of the data processing systems hosts an instance of a trained large language model and a prompt enhancement system.

20. The data processing system of claim 19, wherein the prompt enhancement system supplements prompts submitted to the trained large language model based on local data and data from at least one of the portion of the data processing systems.

* * * * *